(12) United States Patent
Kim et al.

(10) Patent No.: US 12,363,622 B2
(45) Date of Patent: *Jul. 15, 2025

(54) METHOD AND DEVICE FOR OBTAINING INFORMATION ABOUT COMMUNICATION ENTITY OPERATING IN NEW BAND IN WIRELESS LAN SYSTEM

(71) Applicant: LG ELECTRONICS INC., Seoul (KR)

(72) Inventors: Suhwook Kim, Seoul (KR); Jeongki Kim, Seoul (KR); Kiseon Ryu, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,383

(22) Filed: Mar. 26, 2024

(65) Prior Publication Data
US 2024/0236829 A1   Jul. 11, 2024

Related U.S. Application Data

(63) Continuation of application No. 17/269,945, filed as application No. PCT/KR2019/010660 on Aug. 22, 2019, now Pat. No. 11,985,588.

(30) Foreign Application Priority Data

Aug. 23, 2018   (KR) .................. 10-2018-0098873

(51) Int. Cl.
*H04W 48/16*   (2009.01)
*H04W 52/02*   (2009.01)
(Continued)

(52) U.S. Cl.
CPC ....... *H04W 48/16* (2013.01); *H04W 52/0216* (2013.01); *H04W 72/0453* (2013.01);
(Continued)

(58) Field of Classification Search
CPC ............ H04W 48/16; H04W 52/0216; H04W 72/0453; H04W 72/046; H04W 72/23; H04W 84/10; H04W 84/12; Y02D 30/70
See application file for complete search history.

(56) References Cited

U.S. PATENT DOCUMENTS 9,930,713 B2 * 3/2018 Cariou .............. H04W 28/0808
9,949,186 B2 * 4/2018 Cariou .............. H04W 72/0453
(Continued)

FOREIGN PATENT DOCUMENTS

CN   105493421 A *  4/2016  ........... H04L 1/0003
CN   105493558 A *  4/2016  ........... H04L 1/0003
(Continued)

*Primary Examiner* — Eric Nowlin
(74) *Attorney, Agent, or Firm* — LEE, HONG, DEGERMAN, KANG & WAIMEY

(57) ABSTRACT

The present specification relates to a high-efficiency wireless LAN standard operating in a new band. A reception station (STA) according to one embodiment of the present specification can carry out a step of receiving a discovery frame via a 2.4 GHz band or 5 GHz band from a first access point (AP), wherein the discovery frame includes information related to a second AP operating in a 6 GHz band. The reception STA can carry out an association procedure for the second AP operating in the 6 GHz band on the basis of the received information.

9 Claims, 28 Drawing Sheets

(51) Int. Cl.
*H04W 72/044* (2023.01)
*H04W 72/0453* (2023.01)
*H04W 72/23* (2023.01)
*H04W 84/12* (2009.01)

(52) U.S. Cl.
CPC ......... *H04W 72/046* (2013.01); *H04W 72/23* (2023.01); *H04W 84/12* (2013.01)

(56) References Cited

U.S. PATENT DOCUMENTS

| | | | | |
|---|---|---|---|---|
| 10,219,203 | B2* | 2/2019 | Zhang | H04W 48/16 |
| 10,237,891 | B1* | 3/2019 | Chu | H04W 48/16 |
| 10,299,198 | B2* | 5/2019 | Calcev | H04W 28/10 |
| 10,575,240 | B2* | 2/2020 | Abouelseoud | H04W 48/10 |
| 10,659,540 | B2* | 5/2020 | Cariou | H04W 52/50 |
| 10,708,720 | B2* | 7/2020 | Cariou | G01S 13/765 |
| 10,716,054 | B2* | 7/2020 | Cherian | H04W 48/16 |
| 10,979,169 | B2* | 4/2021 | Huang | H04L 1/0003 |
| 11,019,559 | B2* | 5/2021 | Wu | H04W 48/16 |
| 11,102,715 | B2* | 8/2021 | Gan | H04W 8/005 |
| 11,228,963 | B2* | 1/2022 | Patil | H04W 48/16 |
| 11,272,436 | B2* | 3/2022 | Gan | H04W 48/08 |
| 11,350,299 | B2* | 5/2022 | Canpolat | H04W 76/11 |
| 11,432,228 | B2* | 8/2022 | Abouelseoud | H04W 8/005 |
| 11,445,431 | B2* | 9/2022 | Patil | H04W 8/245 |
| 11,470,542 | B2* | 10/2022 | Cherian | H04W 48/16 |
| 11,510,269 | B2* | 11/2022 | Asterjadhi | H04W 76/15 |
| 11,564,150 | B2* | 1/2023 | Cherian | H04W 48/10 |
| 11,659,412 | B2* | 5/2023 | Stacey | H04W 72/0453 370/252 |
| 11,664,925 | B2* | 5/2023 | Huang | H04L 1/0005 370/329 |
| 11,665,626 | B2* | 5/2023 | Abouelseoud | H04B 7/0617 370/252 |
| 11,985,588 | B2* | 5/2024 | Kim | H04W 72/0453 |
| 12,052,651 | B2* | 7/2024 | Cherian | H04W 48/10 |
| 2012/0051351 | A1* | 3/2012 | Lee | H04B 7/0452 370/338 |
| 2016/0198328 | A1* | 7/2016 | Qi | H04L 27/0006 370/330 |
| 2016/0366254 | A1* | 12/2016 | Asterjadhi | H04L 5/0091 |
| 2017/0070930 | A1* | 3/2017 | Cariou | H04W 36/08 |
| 2017/0171796 | A1* | 6/2017 | Wu | H04W 48/16 |
| 2017/0273012 | A1* | 9/2017 | Zhang | H04L 43/16 |
| 2018/0054847 | A1* | 2/2018 | Cariou | H04W 28/0861 |
| 2018/0192358 | A1* | 7/2018 | Calcev | H04W 76/10 |
| 2018/0270038 | A1* | 9/2018 | Oteri | H04W 72/1215 |
| 2018/0278697 | A1* | 9/2018 | Cariou | H04L 41/0246 |
| 2018/0376406 | A1* | 12/2018 | Au | H04W 48/08 |
| 2019/0037595 | A1* | 1/2019 | Cherian | H04W 74/006 |
| 2019/0082379 | A1* | 3/2019 | Abouelseoud | H04W 16/28 |
| 2019/0098565 | A1* | 3/2019 | Cherian | H04W 48/16 |
| 2019/0238259 | A1* | 8/2019 | Huang | H04L 1/0005 |
| 2019/0373439 | A1* | 12/2019 | Abouelseoud | H04W 8/005 |
| 2020/0015041 | A1* | 1/2020 | Cariou | H04W 4/50 |
| 2020/0112910 | A1* | 4/2020 | Cherian | H04W 72/0446 |
| 2020/0169946 | A1* | 5/2020 | Abouelseoud | H04W 40/246 |
| 2020/0344677 | A1* | 10/2020 | Cherian | H04W 40/244 |
| 2021/0007168 | A1* | 1/2021 | Asterjadhi | H04W 52/0216 |
| 2021/0014776 | A1* | 1/2021 | Patil | H04W 48/08 |
| 2021/0014911 | A1* | 1/2021 | Patil | H04W 12/73 |
| 2021/0203439 | A1* | 7/2021 | Huang | H04W 80/02 |
| 2021/0204204 | A1* | 7/2021 | Kim | H04W 48/16 |
| 2021/0258806 | A1* | 8/2021 | Stacey | H04W 72/0453 |
| 2021/0297883 | A1* | 9/2021 | Canpolat | H04W 76/11 |
| 2022/0173773 | A1* | 6/2022 | Lou | H04B 17/336 |
| 2022/0338109 | A1* | 10/2022 | Cherian | H04W 48/08 |
| 2022/0345991 | A1* | 10/2022 | Changlani | H04W 48/16 |
| 2022/0345992 | A1* | 10/2022 | Changlani | H04W 48/16 |
| 2022/0353791 | A1* | 11/2022 | Abouelseoud | H04W 72/046 |
| 2023/0007572 | A1* | 1/2023 | Patil | H04W 74/0808 |
| 2023/0054755 | A1* | 2/2023 | Patil | H04W 76/15 |
| 2023/0146138 | A1* | 5/2023 | Asterjadhi | H04B 7/0413 370/311 |
| 2023/0156492 | A1* | 5/2023 | Gan | H04W 24/02 370/329 |
| 2023/0224799 | A1* | 7/2023 | Cherian | H04W 48/10 370/329 |
| 2023/0379995 | A1* | 11/2023 | Patil | H04W 76/15 |
| 2024/0031915 | A1* | 1/2024 | Gan | H04W 48/16 |

FOREIGN PATENT DOCUMENTS

| | | | | |
|---|---|---|---|---|
| CN | 105493567 A | * | 4/2016 | .......... H04L 1/0003 |
| CN | 105493571 A | * | 4/2016 | .......... H04L 1/0003 |
| CN | 105493421 B | * | 9/2017 | .......... H04L 1/0003 |
| CN | 107205259 A | * | 9/2017 | ........... H04L 43/12 |
| CN | 107743722 A | * | 2/2018 | .......... H04L 5/0007 |
| CN | 105493558 B | * | 3/2018 | .......... H04L 1/0003 |
| CN | 108391304 A | * | 8/2018 | .......... H04L 5/0053 |
| CN | 107205259 B | * | 11/2020 | ............. H04L 43/12 |
| CN | 108391304 B | * | 8/2021 | .......... H04L 5/0053 |
| CN | 114097255 A | * | 2/2022 | ........... H04L 1/1621 |
| CN | 114128331 A | * | 3/2022 | ........... H04L 1/1621 |
| CN | 114158121 A | * | 3/2022 | .......... H04L 5/0007 |
| CN | 115460673 A | * | 12/2022 | .......... H04W 48/08 |
| CN | 114097255 B | * | 1/2023 | ........... H04L 1/1621 |
| DE | 102014014429 A1 | * | 4/2015 | ........ H04L 41/0668 |
| DE | 102014014429 B4 | * | 10/2022 | ........ H04L 41/0668 |
| EP | 3220688 A1 | * | 9/2017 | ............. H04L 43/12 |
| EP | 3220688 B1 | * | 2/2020 | ............. H04L 43/12 |
| EP | 3243292 B1 | * | 3/2020 | .......... H04L 5/0037 |
| EP | 3687101 A1 | * | 7/2020 | .......... H04L 5/0037 |
| EP | 3704898 B1 | * | 8/2022 | .......... H04B 17/364 |
| EP | 4102762 A1 | * | 12/2022 | .......... H04L 5/0037 |
| EP | 4102895 A1 | * | 12/2022 | .......... H04B 17/364 |
| EP | 4109977 A1 | * | 12/2022 | .......... H04B 17/364 |
| GB | 2459434 A | * | 10/2009 | ........... H04W 16/18 |
| JP | 2015076044 A | * | 4/2015 | |
| JP | 2018506219 A | * | 3/2018 | |
| JP | 6599994 B2 | * | 10/2019 | .......... H04L 5/0037 |
| KR | 20170110596 A | * | 10/2017 | |
| KR | 20220031013 A | * | 3/2022 | |
| KR | 20220034786 A | * | 3/2022 | |
| RU | 2569804 C2 | * | 11/2015 | ............. G06Q 10/10 |
| TW | 200913741 A | * | 3/2009 | .......... H04L 63/107 |
| TW | I471048 B | * | 1/2015 | |
| TW | 202110265 A | * | 3/2021 | ........... H04L 1/1621 |
| TW | 202110267 A | * | 3/2021 | ........... H04L 1/1621 |
| WO | WO-2012002757 A2 | * | 1/2012 | .......... H04B 7/0452 |
| WO | WO-2016112306 A1 | * | 7/2016 | .......... H04L 5/0037 |
| WO | WO-2017040067 A1 | * | 3/2017 | ............. H04B 7/022 |
| WO | WO-2018048229 A1 | * | 3/2018 | .......... H04L 5/0055 |
| WO | WO-2018140177 A2 | * | 8/2018 | ............. H04W 4/02 |
| WO | WO-2018204457 A1 | * | 11/2018 | .......... H04B 17/318 |
| WO | WO-2018232138 A1 | * | 12/2018 | |
| WO | WO-2021003181 A1 | * | 1/2021 | .......... H04B 7/0413 |
| WO | WO-2021011426 A1 | * | 1/2021 | ........... H04L 1/1621 |
| WO | WO-2021011427 A1 | * | 1/2021 | ........... H04L 1/1621 |
| WO | WO-2023027799 A1 | * | 3/2023 | .......... H04W 36/06 |

\* cited by examiner

FIG. 20

| Element ID | Length | BSSID (2010) | BSSID Information | Operating Class (2020) | Channel Number (2030) | PHY Type | Sub-elements (2040) |
|---|---|---|---|---|---|---|---|
| 1 | 1 | 6 | 4 | 1 | 1 | 6 | variable |

Octets :

FIG. 21

| B0 | B1 | B2 | B3 | B4 | B9 | B10 | B11 | B12 | B13 |
|---|---|---|---|---|---|---|---|---|---|
| AP Reachability (2110) | | Security (2111) | Key Scope (2112) | Capabilities (2113) | | Mobility Domain (2114) | High Throughput (2120) | Very High Throughput (2130) | FTM |
| Bits: 2 | | 1 | 1 | 6 | | 1 | 1 | 1 | 1 |

| B14 | B15 | B16 |
|---|---|---|
| High Efficiency (2140) | ER BSS (2150) | Co-located AP (2160) |
| Bits: 1 | 1 | 1 |

FIG. 22

| Element ID | Length | Element ID Extension | HE STA Count (2210) | Utilization (2220) | Frequency Underutilization (2230) | Spatial Stream Underutilization (2240) |
|---|---|---|---|---|---|---|
| 1 | 1 | 1 | 2 | 1 | 1 | 1 |

Octets :

FIG. 23

| Element ID | Length | Element ID Extension | HE Operation Parameters (2310) | BSS Color Information | Basic HE-MCS And NSS Set | VHT Operation Information | Max Co-Hosted BSSID Indicator | 6 GHz Operation Information (2320) |
|---|---|---|---|---|---|---|---|---|
| 1 | 1 | 1 | 3 | 1 | 2 | 0 or 3 | 0 or 1 | 0 or 5 |

Octets:

FIG. 24

| TWT Required (2410) | 6 GHz Operation Information Present (2420) |
|---|---|

FIG. 25

| Primary Channel (2510) | Control (2520) | Channel Center Frequency Segment 0 (2530) | Channel Center Frequency Segment 1 (2540) |
|---|---|---|---|

Octets :      1            1            1            1

METHOD AND DEVICE FOR OBTAINING INFORMATION ABOUT COMMUNICATION ENTITY OPERATING IN NEW BAND IN WIRELESS LAN SYSTEM

CROSS-REFERENCE TO RELATED APPLICATIONS

This application is a continuation of U.S. patent application Ser. No. 17/269,945, filed on Feb. 19, 2021, which is the National Stage filing under 35 U.S.C. 371 of International Application No. PCT/KR2019/010660, filed on Aug. 22, 2019, which claims the benefit of earlier filing date and right of priority to KR Application No. 10-2018-0098873, filed on Aug. 23, 2018, the contents of which is hereby incorporated by reference herein in its entirety.

BACKGROUND

Field of the Disclosure

The present disclosure relates to a method and device for acquiring information related to a station operating in a new band in a wireless local area network (WLAN) system, and more particularly, to a device and method for transmitting and receiving control information related to an access point operating in a 6 GHz band.

Related Art

Institute of Electrical and Electronics Engineers (IEEE) 802.11 is a technology used in wireless computer networking for a wireless local area network, commonly referred to as a WLAN or Wi-Fi. Specifically, IEEE 802.11 refers to a standard developed by the eleventh working group of the IEEE LAN Standards Committee (IEEE 802).

IEEE 802.11 is a technology designed to compensate for the shortcomings of Ethernet as a wired LAN. IEEE 802.11 is deployed at the end of an Ethernet network and is widely used to minimize unnecessary wiring and maintenance costs.

WLAN technology has evolved through IEEE 802.11/ 11b/11a/11g/11n in early stages. For example, IEEE 802.11n (i.e., a high throughput or HT standard) is known as a communication standard employing a 2.4 GHz band and a 5 GHz band and supporting a speed of up to 600 Mbps.

The WLAN has been further developed through IEEE 802.11ac (i.e., a very high throughput or VHT standard). For example, IEEE 802.11ac (VHT standard) supports a 160 MHZ channel, supports up to eight spatial streams (SSs) through improved multiple-input multiple-output (multi-user multiple-input multiple-output (MU-MIMO)), and supports MU-MIMO for a downlink (DL).

The WLAN has been further developed through IEEE 802.11ax (or high-efficiency or HE standard). IEEE 802.11ax supports a combination of orthogonal frequency-division multiple access (OFDMA) and downlink MU-MIMO. Further, IEEE 802.11ax also supports MU communication for an uplink (UL).

This disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, and a hybrid automatic repeat request (HARQ) technique.

SUMMARY

In order to improve performance of a related art WLAN system, an operation in a new band may be defined. That is, an operation in a new band, rather than the generally used 2.4 GHz and 5 GHz bands, may be defined.

If a new band is supported in the WLAN system, a higher performance technique is proposed because a legacy STA does not operate in the corresponding band. However, in order to perform an operation in the new band, appropriate information related to the new band should be proposed in the provided technique.

An example according to the present disclosure relates to a method and/or device for receiving a signal in a wireless local area network (WLAN) system.

A receiving station according to an example of the present disclosure receives a discovery frame from a first access point (AP) through a 2.4 GHz band or a 5 GHz band, and the discovery frame may perform a step including information related to a second AP operating in a 6 GHz band.

An example of information related to a second AP operating in the 6 GHz band may include first information related to a type of a physical (PHY) layer supported by the second AP operating in the 6 GHz band, second information related to a load of a basic service set (BSS) to which the second AP belongs, third information related to a target wake time (TWT) operation supported by the second AP, and fourth information related to an operating channel in the 6 GHz band.

Advantageous Effects

This disclosure proposes a technical feature supporting a situation in which a 6 GHz band is used in various wireless LAN systems (e.g., IEEE 802.11ax system). Based on various examples of the present disclosure, the WLAN system may support a 6 GHz band operation suitable for APs and non-AP STAs. Specifically, based on an example of the present disclosure, it is possible for the WLAN system to perform an appropriate operation in the 6 GHz band through a technique of transmitting various information related to the 6 GHz band to a STA.

According to an example of the present disclosure, when a discovery message is improved, a non-AP STA may obtain accurate information related to an AP operating in the new 6 GHz band through the legacy 2.4/5 GHz band. Through this, the non-AP STA may successfully complete an association procedure for the AP operating in the 6 GHz band. Based on this, the WLAN system may perform high-performance communication in the 6 GHz band.

BRIEF DESCRIPTION OF THE DRAWINGS

FIG. 20 shows a related art neighbor report improved by the present disclosure.

FIG. 21 shows a part of an improved neighbor report proposed in the present disclosure.

FIG. 22 shows an example of an information field for reporting information related to a BSS load.

FIG. 23 shows an example of a field displaying information related to a target BSS operating in a 6 GHz band.

FIG. 24 shows an example of additional information related to a target BSS operating in a 6 GHz band.

FIG. 25 is another example of additional information related to a target BSS operating in a 6 GHz band.

DESCRIPTION OF EXEMPLARY EMBODIMENTS

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or a new WLAN standard which has enhanced IEEE 802.11be.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

Hereinafter, technical features of the WLAN system to which the present disclosure may be applied will be described to describe the technical features of the present disclosure.

The WLAN system may perform communication through at least one channel (e.g., 20/40/80/160/320 MHz channel) included in various bands.

Figure 1:
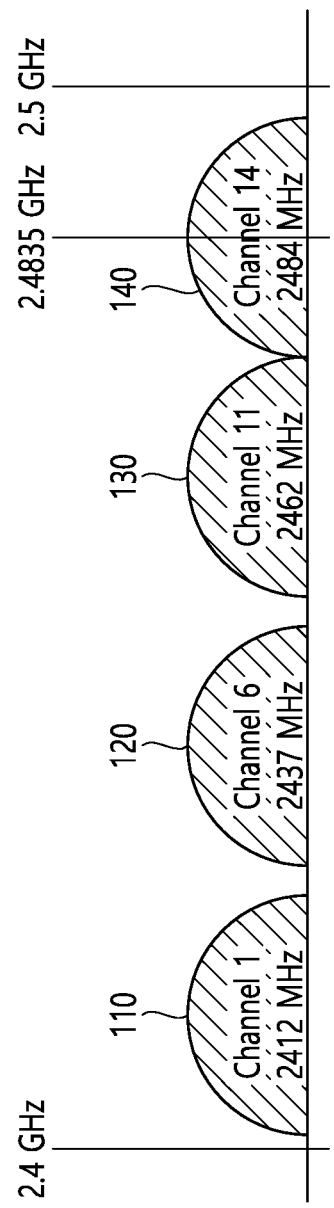
FIG. 1 shows an example of channels used/supported/ defined in a 2.4 GHz band.

FIG. 1 shows an example of channels used/supported/defined in a 2.4 GHz band.

The 2.4 GHz band may be referred to by other names such as a first band. In addition, the 2.4 GHz band may refer to a frequency region in which channels GHz (e.g., channels with a center frequency located within 2.4 to 2.5 GHz) with a center frequency adjacent to 2.4 are used/supported/defined.

The 2.4 GHz band may include multiple 20 MHz channels. 20 MHz in the 2.4 GHz band may have multiple channel indexes (e.g., index 1 to index 14). For example, a center frequency of a 20 MHz channel to which channel index 1 is assigned may be 2.412 GHz, a center frequency of a 20 MHz channel to which channel index 2 is assigned may be 2.417 GHz, and a center frequency of a 20 MHz to which channel index N is assigned may be (2.407+0.005*N) GHz. The channel index may be referred to by various names such as channel number. Specific values of the channel index and the center frequency may be changed.

FIG. 1 exemplarily shows four channels in the 2.4 GHz band. Each of the illustrated first to fourth frequency regions 110 to 140 may include one channel. For example, the first frequency region 110 may include channel #1 (a 20 MHz channel having index 1). Here, a center frequency of channel #1 may be set to 2412 MHz. The second frequency region 120 may include channel #6. Here, a center frequency of channel #6 may be set to 2437 MHz. The third frequency region 130 may include channel #11. Here, a center frequency of channel #11 may be set to 2462 MHz. The fourth frequency region 140 may include channel #14. Here, a center frequency of channel #14 may be set to 2484 MHz.

Figure 2:
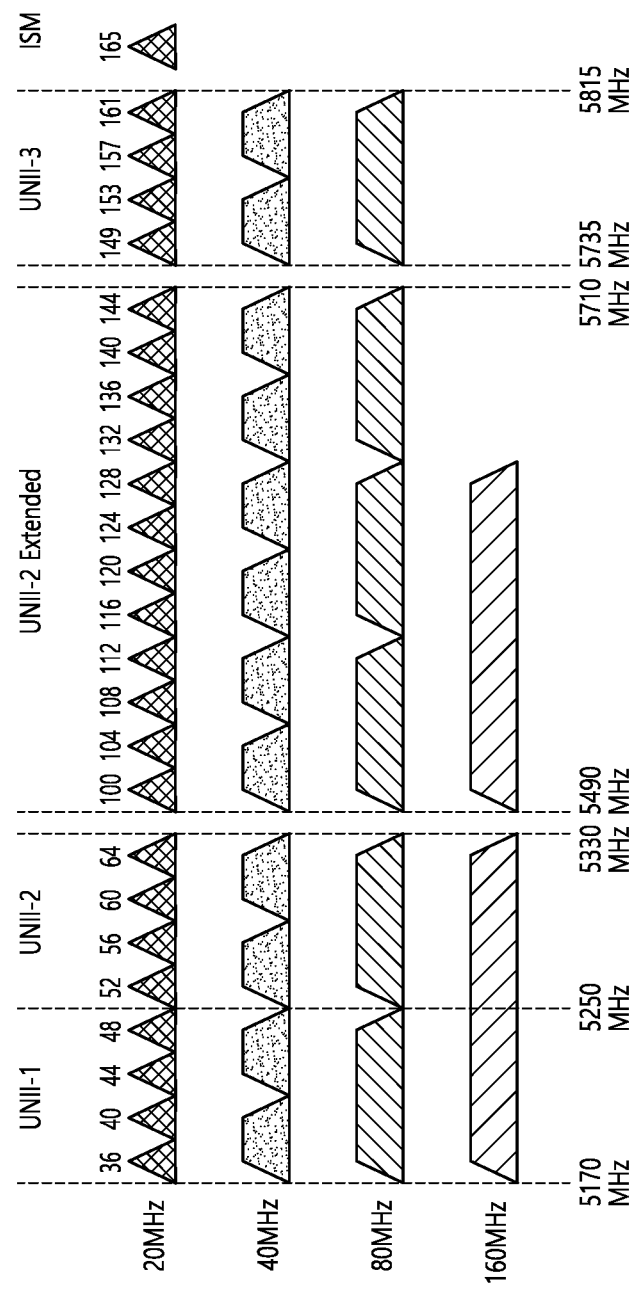
FIG. 2 shows an example of channels used/supported/ defined in a 5 GHz band.

FIG. 2 shows an example of channels used/supported/defined in a 5 GHz band.

The 5 GHz band may be referred to by another name such as a second band. The 5 GHz band may refer to a frequency region in which channels having a center frequency of 5 GHz or higher and less than 6 GHz (or less than 5.9 GHz) are used/supported/defined. Alternatively, the 5 GHz band may include a plurality of channels between 4.5 GHz and 5.5 GHz. The specific values shown in FIG. 2 may be changed.

A plurality of channels in the 5 GHz band includes unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Figure 3:
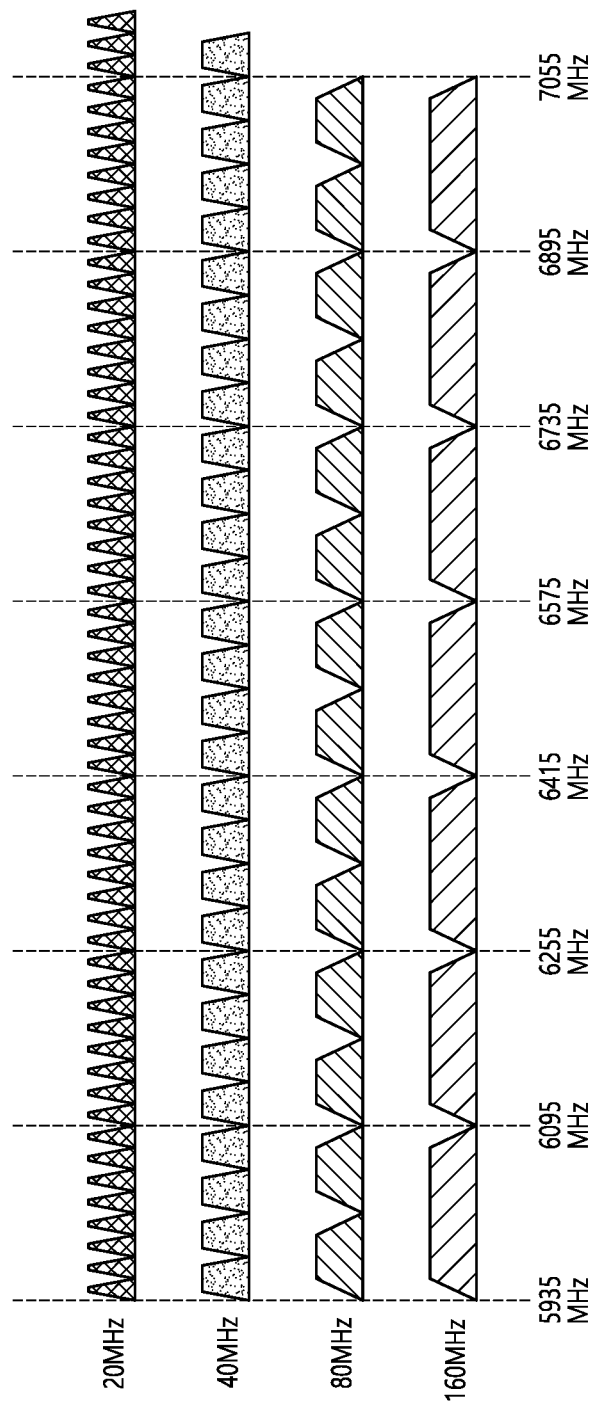
FIG. 3 shows an example of channels used/supported/ defined in a 6 GHz band.

FIG. 3 shows an example of a channel used/supported/defined within a 6 GHz band.

The 6 GHz band may be referred to by other names such as a third band. The 6 GHz band may refer to a frequency region in which channels with a center frequency of 5.9 GHz or higher are used/supported/defined. The specific values shown in FIG. 3 may be changed.

For example, the 20 MHz channel of FIG. 3 may be defined from 5.940 GHz. Specifically, the leftmost channel of the 20 MHz channel of FIG. 3 may have an index #1 (or a channel index, a channel number, etc.), and a center frequency of 5.945 GHz may be allocated. That is, a center frequency of a channel having index #N may be determined as (5.940+0.005*N) GHz.

Accordingly, the indexes (or channel numbers) of the 20 MHz channel of FIG. 3 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. In addition, according to the aforementioned (5.940+0.005*N) GHz rule, the indexes of the 40 MHz channel of FIG. 3 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227.

In the example of FIG. 3, 20, 40, 80, and 160 MHz channels are shown, but a 240 MHz channel or a 320 MHz channel may be added.

Figure 4:
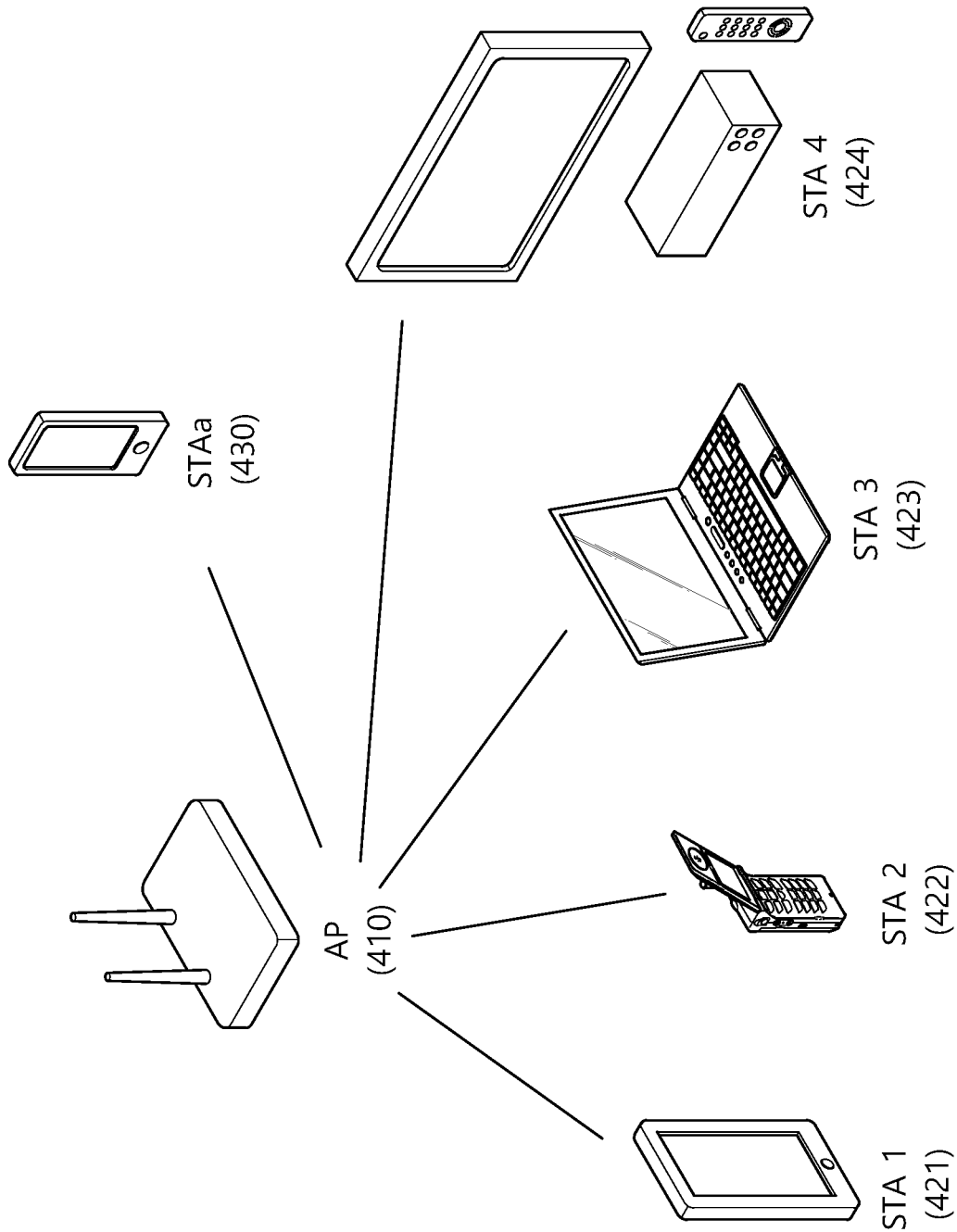
FIG. 4 shows an example of a wireless local area network (WLAN) system to which the example of the present disclosure may be applied.

FIG. 4 shows an example of a WLAN system to which the example of the present disclosure may be applied.

Referring to FIG. 4, a WLAN system includes one or more basic service sets (BSS). The BSS is a set of stations (STAs) that may be successfully synchronized to communicate with each other.

An infrastructure BSS may include one or more non-AP stations 421, 422, 423, 424, and 430, an access point (AP) 410 providing a distributed service, and a distribution system (DS) connecting a plurality of APs. In the infrastructure BSS, the AP may manage the non-AP STAs in the BSS.

The distribution system may form an extended service set (ESS), which is an extended service set by connecting several BSSs. The ESS may be used as a term indicating one network formed by connecting one or several APs through a distribution system. APs included in one ESS may have the same service set identification (SSID).

A portal may serve as a bridge for connecting a wireless LAN network (IEEE 802.11) and another network (e.g., 802.X).

The STAs may establish a network to perform communication, without the AP. Such a network may be referred to as an ad-hoc network or an independent basic service set (IBSS).

Figure 5:
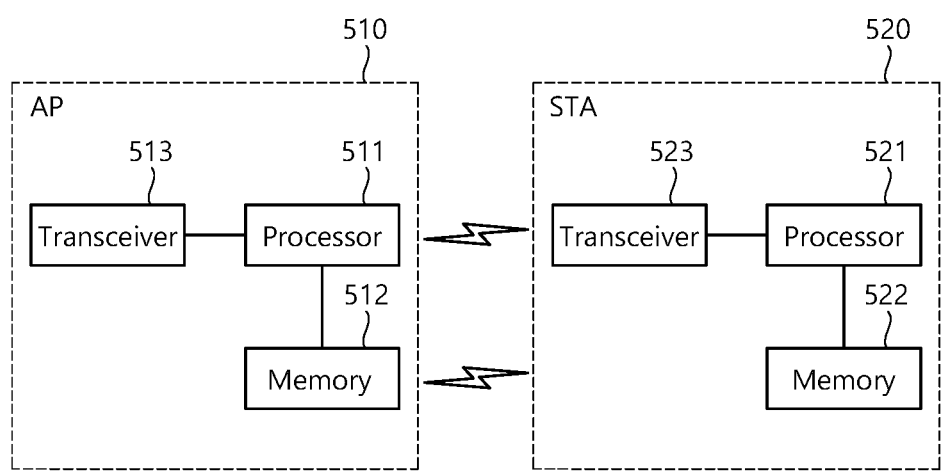
FIG. 5 shows an example of a station included in a WLAN system.

FIG. 5 shows an example of a station included in a WLAN system.

An example of the present disclosure may be performed by the device of FIG. 5.

In an example of the present disclosure, an STA may refer to an AP STA 510 and/or a non-AP STA 520. That is, the STAs 510 and 520 may be used as having a meaning including both an AP and a non-AP STA and, in a broad sense, as a certain functional medium including a medium access control (MAC) according to the regulations of the IEEE 802.11 standard and a physical layer interface for a wireless medium.

The non-AP STA 520 may be referred to by various names such as a mobile terminal, a wireless device, a wireless transmit/receive unit (WTRU), a user equipment (UE), a mobile station (MS), a mobile subscriber unit, or simply, a user.

Referring to FIG. 5, the AP STA 510 may include a processor 511, a memory 512, and a transceiver 513. The illustrated processor, memory, and transceiver may each be implemented as separate chips or at least two or more blocks/functions may be implemented through a single chip.

The transceiver 513 of the AP performs a signal transmission/reception operation. Specifically, IEEE 802.11 packets (e.g., IEEE 802.11a/b/g/n/ac/ax/be, etc.) may be transmitted and received.

The processor 511 of the AP may perform an intended operation of the AP. For example, the processor 511 of the AP may receive a signal through the transceiver 513, process the received signal, generate a transmission signal, and perform control for signal transmission. The memory 512 of the AP may store a signal (i.e., a received signal) received through the transceiver 513 and store a signal (i.e., a transmission signal) to be transmitted through the transceiver.

A transceiver 523 of the non-AP STA performs a signal transmission/reception operation. Specifically, the non-AP STA may transmit and receive IEEE 802.11 packets (e.g., IEEE 802.11a/b/g/n/ac/ax/be, etc.).

A processor 521 of the non-AP STA may perform an intended operation of the AP. For example, the processor 521 of the non-AP STA may receive a signal through the transceiver 523, process the received signal, generate a transmission signal, and perform control for signal transmission. A memory 522 of the non-AP STA may store a signal (i.e., a received signal) received through the transceiver 523 and store a signal (i.e., a transmission signal) to be transmitted through the transceiver.

Figure 6:
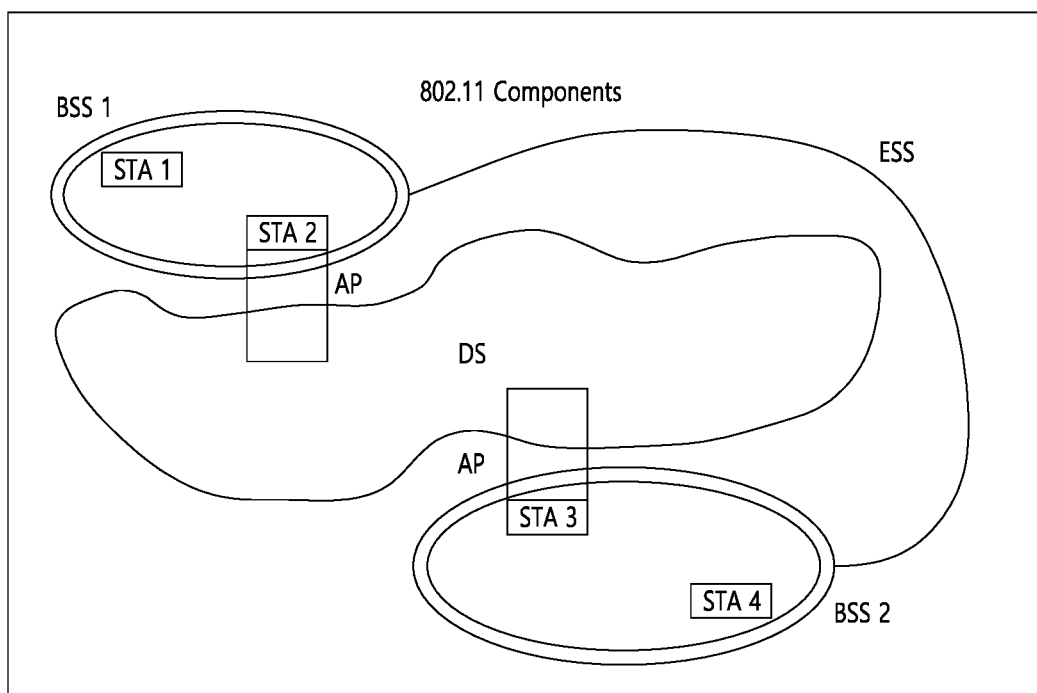
FIG. 6 shows an example of a WLAN system.

FIG. 6 shows an example of a WLAN system.

As shown, the WLAN system includes at least one access point (AP) and a plurality of STAs associated with the AP.

A plurality of STAs shown in FIG. 6 may configure a basic service set (BSS).

The BSS may refer to a set of APs and STAs, such as APs and STAs that may be successfully synchronized to communicate with each other. The BSS may include one or more STAs that may be combined with an AP.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

Figure 7:
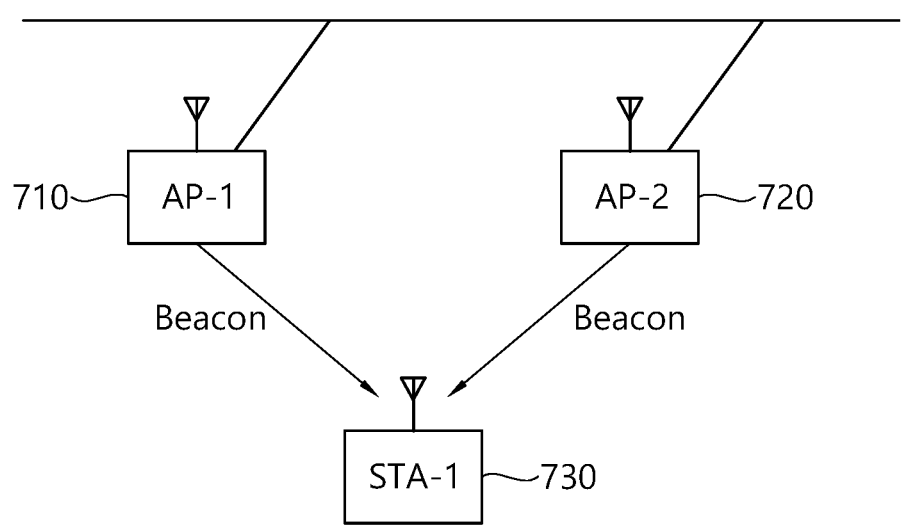
FIG. 7 shows an example of network discovery.

FIG. 7 illustrates an example of network discovery.

In order to access the WLAN network, the STA should perform network discovery. Such discovery may be performed through a scanning process for a network. The scanning method may be divided into active scanning and passive scanning.

The example of FIG. 7 may be related to passive scanning.

Specifically, AP-1 710 and AP-2 720 may transmit a beacon frame during a preset time period. An STA 730 may receive information related to an AP and/or a WLAN system through the received beacon frame.

The beacon frame is an example of a management frame in IEEE 802.11. The beacon frame may be transmitted periodically. An STA performing scanning based on passive scanning may receive a beacon frame, while shifting channels. Upon receiving the beacon frame, the STA 730 may store BSS-related information included in the received beacon frame, shift to a next channel, and perform passive scanning in the next channel.

Figure 8:
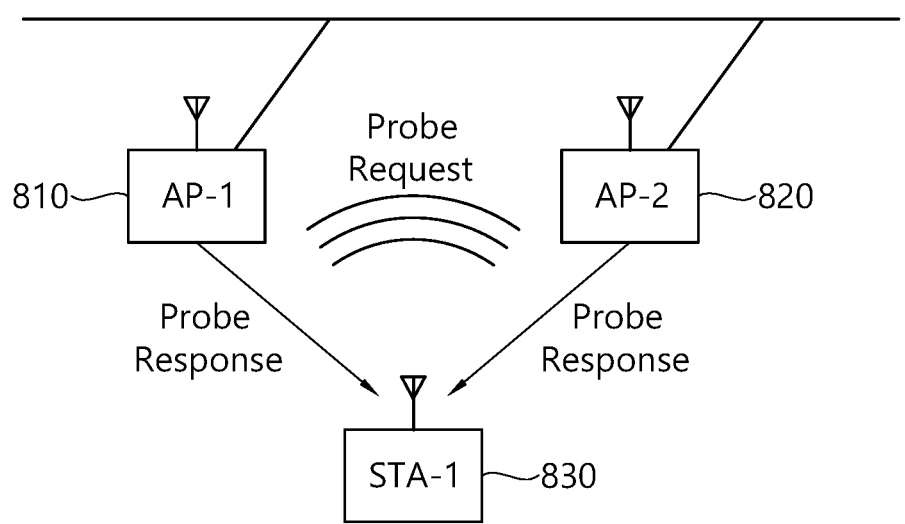
FIG. 8 shows another example of network discovery.

FIG. 8 shows another example of network discovery.

The example of FIG. 8 may be related to active scanning.

As illustrated in FIG. 8, the STA 830 that performs active scanning may transmit a probe request frame to search for an AP 810, 820 present in the vicinity, while moving channels, and wait for a response thereto. A responder may transmit a probe response frame to the STA that has transmitted the probe request frame in response to the probe request frame. The responder may be an STA that last transmitted a beacon frame in a BSS of the channel being scanned. In the BSS, since an AP transmits a beacon frame, the AP becomes a responder, and in an IBSS, since STAs in the IBSS transmit beacon frames by taking turns, the responder may be changed.

When the STA transmits the probe request frame through channel #1 and receives the probe response frame through channel #1, the STA may store BSS-related information included in the received probe response frame, move to a next channel (e.g., channel #2), and repeat scanning in the same manner.

Figure 9:
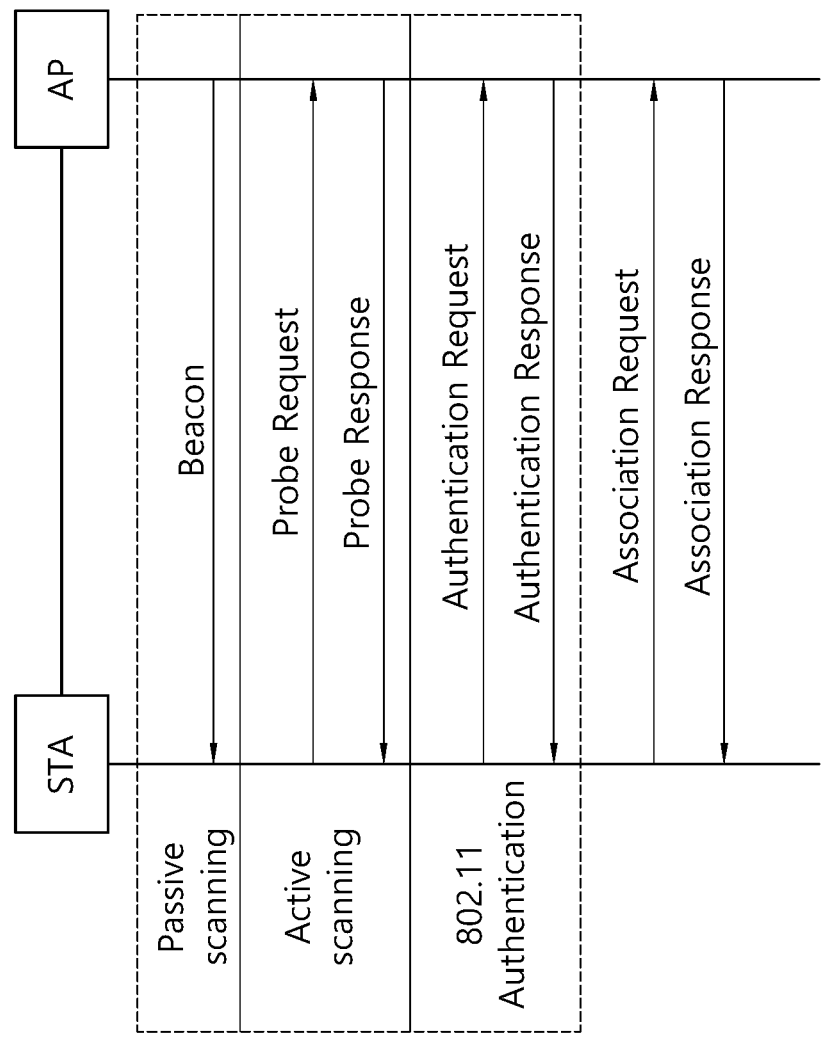
FIG. 9 shows an example of scanning and subsequent operations.

FIG. 9 shows an example of scanning and subsequent operations.

The example of FIG. 9 may be performed based on FIGS. 7 and 8. That is, the user STA may receive the beacon frame of FIG. 7. Alternatively, the user STA may transmit a probe request frame and receive a probe response frame as shown in FIG. 8.

Thereafter, an authentication process as shown in FIG. 9 may be performed. For example, the STA may transmit an authentication request frame to the AP, and in response thereto, the AP may transmit an authentication response frame to the STA. An authentication frame used for authentication request/response corresponds to a management frame.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 10:
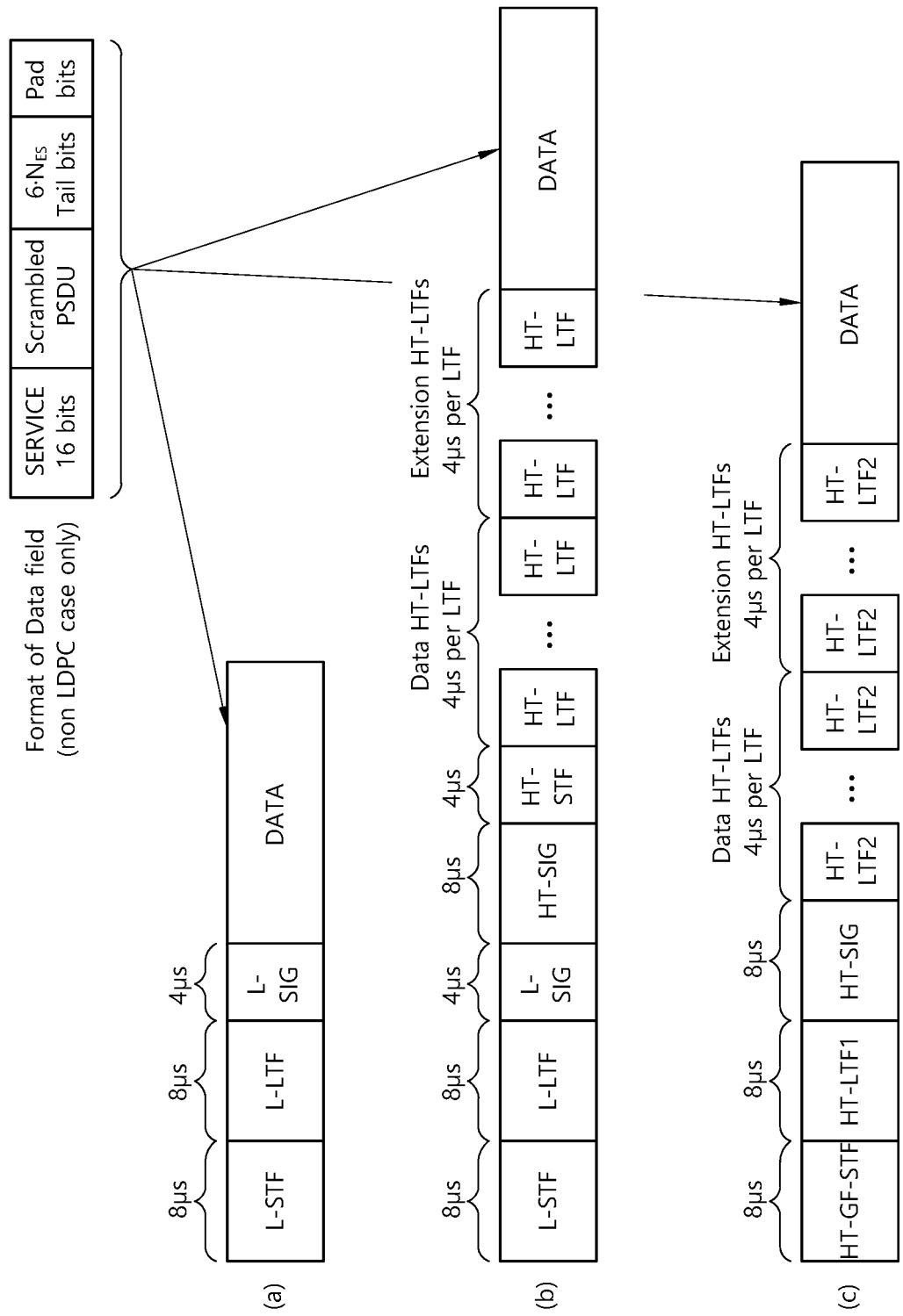
FIG. 10 shows an example of a PPDU used in a legacy WLAN system.

FIG. 10 shows an example of a PPDU used in a legacy WLAN system.

Sub-figure (a) of FIG. 10 shows an example of a PPDU used in the IEEE 802.11a/g standard.

Sub-figure (b) of FIG. 10 shows an example of a PPDU used in the IEEE 802.11n standard.

Sub-figure (c) of FIG. 10 shows another example of a PPDU used in the IEEE 802.11n standard.

In general, the PPDU may include a short training field (STF). STF may be embodied as L L-STF, HT-STF, VHT-STF, HE-STF, EHT-STF, etc. used in the example of FIG. 10 or an additional example. STF may be used for frame detection, automatic gain control (AGC), diversity detection, coarse frequency/time synchronization, and the like.

A typical PPDU may include a long training field (LTF) 520. The LTF may be embodied as L-LTF, HT-LTF, VHT-LTF, HE-LTF, EHT-LTF, etc. used in the example of FIG. 10 or an additional example. LTF may be used for frequency/time synchronization and channel prediction.

A typical PPDU may include an SIG. The SIG may be embodied as L-SIG, HT-SIG, VHT-SIG, HE-SIG, EHT-SI, etc. used in the example of FIG. 10 or an additional example. The SIG may include control information for decoding the PPDU.

A typical PPDU may include a data field. The data field may be included in the example of FIG. 10 or an additional example. As illustrated in FIG. 10, the data field may include a SERVICE field, a physical layer service data unit (PSDU), a PPDU TAIL bit, and a padding bit. Some bits of the SERVICE field may be used for synchronization of a descrambler at a receiving end. The PSDU corresponds to a MAC protocol data init (MPDU) defined in a MAC layer and may include data generated/used in a higher layer. The PPDU TAIL bit may be used to return an encoder to a zero (0) state. The padding bit may be used to adjust a length of the data field in a predetermined unit.

Figure 11:
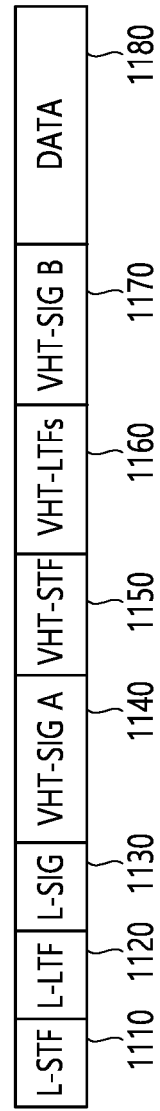
FIG. 11 shows another example of a PPDU according to a legacy WLAN standard.

FIG. 11 shows another example of a PPDU according to a legacy WLAN standard.

FIG. 11 shows an example of a PPDU according to the IEEE 802.11ac standard (i.e., VHT standard). The illustrated common fields include the legacy L-STF 1110, L-LTF 1120, and L-SIG 1130, and also include a VHT-SIG-A field 1140 newly proposed in the IEEE 802.11ac standard. The PPDU of FIG. 11 may be used in both single user (SU) communication in which a signal is transmitted from an AP to one user STA and multi-user (MU) communication in which a signal is transmitted from an AP to a plurality of user STAs. When MU communication is performed, the VHT-SIG-A field 1140 includes common control information commonly applied to all receiving STAs.

When the PPDU of FIG. 11 is used for MU communication, VHT-STF 1150, VHT-LTF 1160, VHT-SIG-B 1170, and data fields 1180 are configured as per-user fields.

The VHT-STF 1150 is an STF field newly proposed in the VHT standard (i.e., IEEE 802.11ac), and the VHT-LTF 1160 is an LTF field newly proposed in the VHT standard. The VHT-SIG-B 1170 includes information for decoding the data field 1180 and may be individually configured for each receiving STA.

The PPDU of FIG. 11 may be transmitted to a plurality of STAs based on a multi-user multiple input, multiple output (MU-MIMO) technique. In addition, it may be transmitted to one STA based on the SU-MIMO technique.

Figure 12:
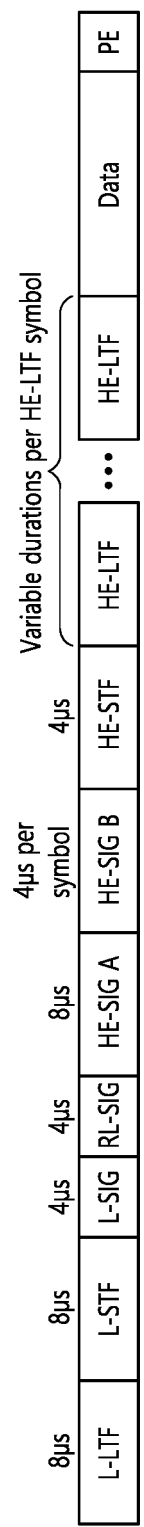
FIG. 12 is a view showing another example of an HE-PPDU.

FIG. 12 is a diagram showing another example of an HE-PPDU.

The example of FIG. 12 may be applied to an IEEE 802.11ax or high efficiency (HE) WLAN system. Four PPDU formats according to IEEE 802.11ax, are defined and an example of FIG. 12 is an example of MU-PPDU used for MU communication. However, some of the technical features applied to the field shown in FIG. 12 may be used as it is for SU communication or UL-MU communication.

The technical features of the HE-PPDU shown in FIG. 12 may be applied to a newly proposed EHT-PPDU. For example, technical features applied to HE-SIG may also be applied to EHT-SIG, and technical features applied to HE-STF/LTF may also be applied to EHT-SFT/LTF.

The L-STF of FIG. 12 may include a short training orthogonal frequency division multiplexing symbol (OFDM symbol). The L-STF may be used for frame detection, automatic gain control (AGC), diversity detection, and coarse frequency/time synchronization.

The L-LTF of FIG. 12 may include a long training orthogonal frequency division multiplexing symbol (OFDM). L-LTF may be used for fine frequency/time synchronization and channel prediction.

The L-SIG of FIG. 12 may be used to transmit control information. The L-SIG may include information related to a data rate and data length. In addition, the L-SIG may be repeatedly transmitted. That is, it may be configured in a format in which L-SIG is repeated (e.g., it may be referred to as R-LSIG).

HE-SIG-A of FIG. 12 may include control information common to a receiving station.

Specifically, the HE-SIG A may include 1) a DL/UL indicator, 2) a BSS color field which is an identifier of a BSS, 3) a field indicating a remaining time of a current TXOP section, 4) a bandwidth field indicating 20, 40, 80, 160, 80+80 MHz, 5) a field indicating an MCS scheme applied to an HE-SIG B, 6) a field indicating whether the HE-SIG B is modulated according to a dual subcarrier modulation technique for MCS, 7) a field indicating the number of symbols used for the HE-SIG B, 8) a field indicating whether the HE-SIG B is generated over the entire band, 9) a field indicating the number of symbols of the HE-LTF, 10) a field indicating a length of the HE-LTF and a CP length, 11) a field indicating whether there is an additional OFDM symbol for LDPC coding, 12) a field indicating control information related to packet extension (PE), and 13) a field indicating information related to a CRC field of the HE-SIG A. These specific fields of the HE-SIG A may be added or some of them may be omitted. In addition, in environments other than a multi-user (MU) environments, some fields in the HE-SIG-A may be added or omitted.

As described above, the HE-SIG B of FIG. 12 may be included only in the case of a PPDU for multiple users (MU). Basically, the HE-SIG A or the HE-SIG B may include resource allocation information (or virtual resource allocation information) for at least one receiving STA.

An HE-STF of FIG. 12 may be used to improve automatic gain control estimation in a multiple input multiple output (MIMO) environment or an OFDMA environment.

An HE-LTF of FIG. 12 may be used to estimate a channel in the MIMO environment or the OFDMA environment.

A size of fast Fourier transform (FFT)/inverse fast Fourier transform (IFFT) applied to the HE-STF and a field after the HE-STF of FIG. 12 may be different from a size of the FFT/IFFT applied to the field before the HE-STF. For example, the size of the FFT/IFFT applied to the HE-STF and the field after the HE-STF may be 4 times larger than the size of the FFT/IFFT applied to the field before the HE-STF.

For example, when at least one field among L-STF, L-LTF, L-SIG, HE-SIG A, and HE-SIG B on the PPDU of FIG. 12 is referred to as a first field/part, at least one of a data field, HE-STF, and HE-LTF may be referred to as a second field/part. The first field may include a field related to the legacy system, and the second field may include a field related to an HE system. In this case, the size of FFT/IFFT may be defined as N times the size of FFT/IFFT used in the legacy WLAN system (N is a natural number, e.g., N=1, 2, and 4). That is, FFT/IFFT having a size of N (=4) times may be applied to the second field of the HE PPDU, compared to the first field of the HE PPDU. For example, 256 FFT/IFFT may be applied for a bandwidth of 20 MHz, 512 FFT/IFFT may be applied for a bandwidth of 40 MHz, 1024 FFT/IFFT is applied for a bandwidth of 80 MHz, and 2048 FFT/IFFT may be applied for a continuous or discontinuous bandwidth of 160 MHz.

In other words, subcarrier spacing may have a size of 1/N times subcarrier spacing used in the legacy WLAN system (N is a natural number, for example, when N=4, 78.125 kHz). That is, subcarrier spacing having a size of 312.5 kHz which is legacy subcarrier spacing may be applied to the first field/part of the HE PPDU, and subcarrier spacing having a size of 78.125 kHz may be applied to the second field/part of the HE PPDU.

Alternatively, an IDFT/DFT period applied to each symbol of the first field may be expressed to be N (=4) times shorter than the IDFT/DFT period applied to each data symbol of the second field. That is, a length of IDFT/DFT applied to each symbol of the first field of the HE PPDU may be expressed as 3.2 μs, and a length of IDFT/DFT applied to each symbol of the second field of the HE PPDU may be expressed as 3.2 μs*4 (=12.8 μs). A length of an OFDM symbol may be a value obtained by adding a length of a guard interval (GI) to the length of the IDFT/DFT. The length of the GI may be various values such as 0.4 μs, 0.8 μs, 1.6 μs, 2.4 μs, and 3.2 μs.

As described above, the technical features in which subcarrier spacing of different sizes is applied to one PPDU may also be applied to the EHT-PPDU as it is. That is, subcarrier spacing having a size of 312.5 kHz may be applied to the first field/part of the EHT-PPDU, and subcarrier spacing having a size of 78.125 kHz may be applied to the second field/part of the EHT PPDU. The first field/part of the EHT-PPDU may include L-LTF, L-STF, L-SIG, EHT-SIG-A, and/or EHT-SIG-B. In addition, the second field/part of the EHT-PPDU may include EHT-STF, EHT-LTF, and/or a data field. The classification of the first part/second part of the EHT-PPDU may be changed.

Figure 13:
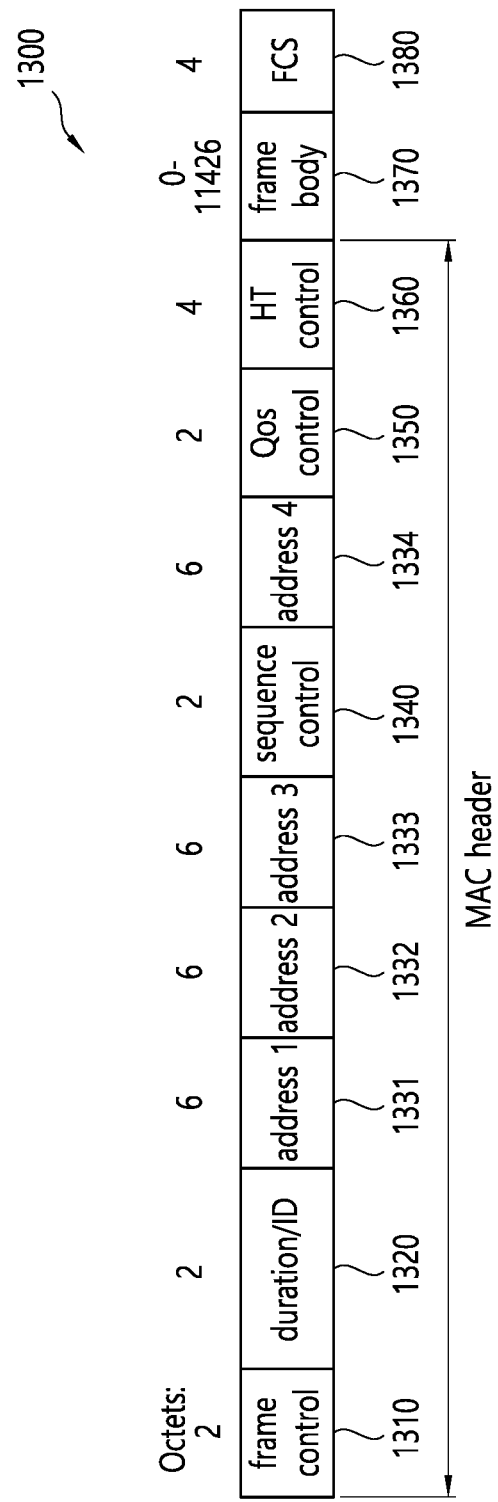
FIG. 13 shows an example of a MAC frame.

FIG. 13 shows an example of a MAC frame.

The MAC frame of FIG. 13 may be included in a data field (i.e., MPDU) of a PPDU presented herein.

Referring to FIG. 13, a MAC frame 1300 includes a frame control field 1310, a duration/ID (duration/ID) field 1320, an address 1 field 1331, an address 2 field 1332, an address 3 field 1333, a sequence control field 1340, an address 4 field 1334, a QoS control field 1350, an HT control field 1360, a frame body 1370, and a frame check sequence (FCS) field 1380.

Figure 14:
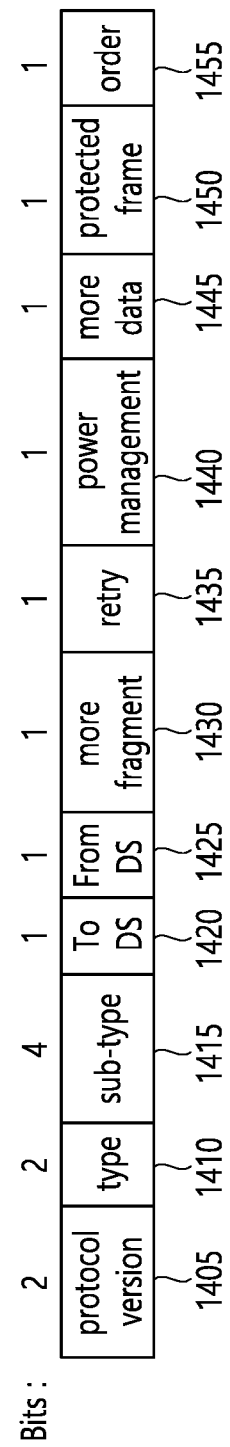
FIG. 14 shows an example of a frame control field format of a MAC frame.

The frame control field 1310 includes information related to frame characteristics. A specific structure of the frame control field 1310 is shown in FIG. 14.

The duration/ID field 1320 may be implemented to have different values according to a type and a subtype of the frame 1300. When the type and subtype of the frame 1300 are a PS-poll frame for power save operation, the duration/ID field 1320 may be set to include an AID of an STA that transmitted the frame 1300. In other cases, the duration/ID field 1320 may be set to have a specific duration value according to the frame 1300 type and subfield. When the frame 1300 is an MPDU included in the A-MPDU format, the duration/ID field 1320 included in the MAC header of each MPDU may all be implemented to have the same value.

The address 1 field to address 4 field 1331 to 1334 may be set to implement specific fields among a BSSID field indicating a BSSID, a source address (SA) field indicating an SA, a destination address (DA) field indicating a DA, a transmitting address (TA) field indicating a transmitting STA address, and a receiving address (RA) field indicating a receiving STA address. Meanwhile, the address field implemented as the TA field may be set as a bandwidth signaling TA value, and in this case, the TA field may indicate that the frame includes additional information in the scrambling sequence. The bandwidth signaling TA may be expressed as a MAC address of the STA that transmits the corresponding frame, but an individual/group bit included in the MAC address may be set to a specific value, for example, 1.

The sequence control field 1340 is set to include a sequence number and a fragment number. The sequence number may indicate a sequence number allocated to the frame 1300. The fragment number may indicate the number of each fragment of the frame 1300.

The QoS control field 1350 includes information related to QoS.

The HT control field 1360 includes control information related to an HT scheme/EHT scheme.

The frame body 1370 may include data to be transmitted by the transmitting STA and/or the AP. In the frame body 1370, a body component excluding a MAC header and an FCS in a control frame, a management frame, an action frame, and/or a data frame to be transmitted may be implemented. When the frame 1300 is a management frame and/or an action frame, information elements included in the management frame and/or an action frame may be implemented in the frame body 1370.

The FCS field 1380 includes a bit sequence for CRC.

FIG. 14 is a block diagram showing an example of a frame control field format of a MAC frame.

Referring to FIG. 14, a frame control field 1400 includes a protocol version subfield 1405, a type subfield 1410, a subtype subfield 1415, and a To DS subfield 1420, a From DS subfield 1425, a More Fragment subfield 1430, a Retry subfield 1435, a Power Management subfield 1440, a More Data subfield 1445, a Protected Frame subfield 1450, and an Order subfield 1455.

The protocol version subfield 1405 may be set to indicate a version of a wireless LAN protocol applied to a corresponding MAC frame.

The type sub-field 1410 and the sub-type sub-field 1415 may be set to indicate information identifying a function of a frame including the corresponding frame control field 1400.

The To DS subfield 1420 and the From DS subfield 1425 may be determined according to a preset rule. For example, for a data frame directly transmitted from one STA to another STA in the same IBSS, a first value may be assigned to the To DS subfield 1420 and the From DS subfield 1425.

The More Fragment subfield 1430 may be set to indicate whether there is a fragment to be transmitted following the corresponding MAC frame.

The Retry Subfield 1435 may be set to indicate whether the corresponding MAC frame is based on retransmission of a previous frame.

The Power Management subfield 1440 may be set to indicate a power management mode of the STA.

The More Data subfield 1445 may be set to indicate whether a frame to be additionally transmitted exists.

The Protected Frame subfield 1450 may be set to include information indicating whether a frame body part has been processed by the encryption encapsulation algorithm.

Hereinafter, a resource unit (RU) used in the PPDU will be described. The resource unit may include a plurality of subcarriers (or tones). The RU may be used to transmit signals to multiple STAs based on an OFDMA technique. Also, an RU may be defined even when a signal is transmitted to one STA. The RU may be used for STF, LTF, data fields, and the like.

OFDMA communication based on an RU may be applied to the HE-PPDU shown in FIG. 12. That is, the RU described below may be applied to HE-STF, HE-LTF and data fields generated according to HE standards.

Figure 15:
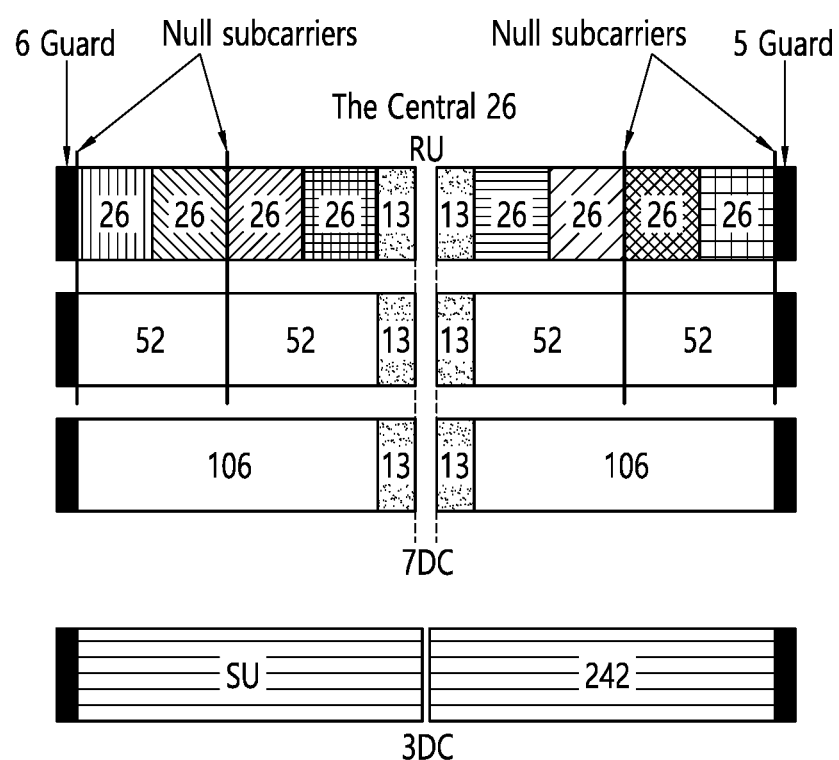
FIG. 15 is a view showing an arrangement of resource units (RUs) used in a 20 MHz band.

FIG. 15 is a diagram showing an arrangement of RUs used in a 20 MHz band.

As shown in FIG. 15, resource units (RUs) corresponding to different numbers of tones (i.e., subcarriers) may be used to configure some fields of the HE-PPDU. For example, resources may be allocated in units of RUs shown for HE-STF, HE-LTF, and data fields.

As shown at the top of FIG. 15, 26-units (i.e., units corresponding to 26 tones) may be disposed. In the leftmost band of the 20 MHz band, 6 tones may be used as a guard band, and in the rightmost band of the 20 MHz band, 5 tones may be used as a guard band. In addition, 7 DC tones are inserted at a center band, that is, the DC band, and 26 units corresponding to 13 tones may exist on the left and right sides of the DC band. In addition, 26 units, 52 units, and 106 units may be allocated to other bands. Each unit may be assigned for a receiving station, i.e. a user.

Meanwhile, the RU arrangement of FIG. 15 is utilized not only in a situation for a plurality of users (MU), but also in a situation for a single user (SU). In this case, one 242-unit may be used, and in this case 3 DC tones may be inserted.

In the example of FIG. 15, RUs of various sizes, that is, 26-RU, 52-RU, 106-RU, 242-RU, etc., have been proposed. Since a specific size of the RUs may be expanded or increased, the embodiment is not limited to the specific size of each RU (i.e., the number of corresponding tones).

Figure 16:
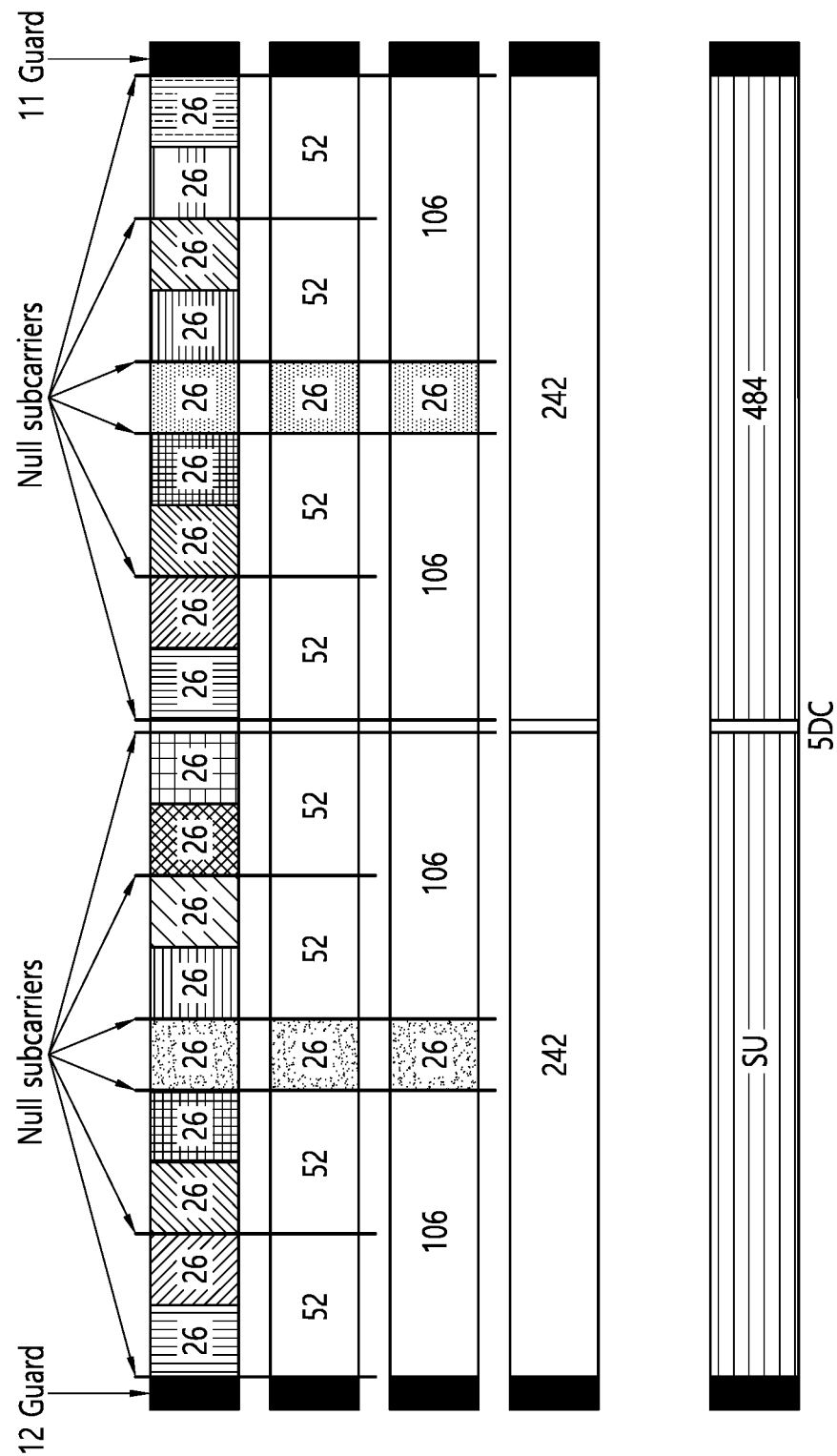
FIG. 16 is a diagram showing an arrangement of RUs used in a 40 MHz band.

FIG. 16 is a diagram showing an arrangement of a resource unit (RU) used in a 40 MHz band.

Similar to the use of RUs having various sizes in the example of FIG. 15, 26-RU, 52-RU, 106-RU, 242-RU, 484-RU, and the like may be used in the example of FIG. 16. In addition, 5 DC tones may be inserted into a center frequency, 12 tones may be used as a guard band at the leftmost band of the 40 MHz band, and 11 tones may be used as a guard band at the rightmost band of the 40 MHz band.

Also, as shown, when used for a single user, a 484-RU may be used. Meanwhile, the fact that the specific number of the RUs is changed is the same as the example of FIG. 15.

Figure 17:
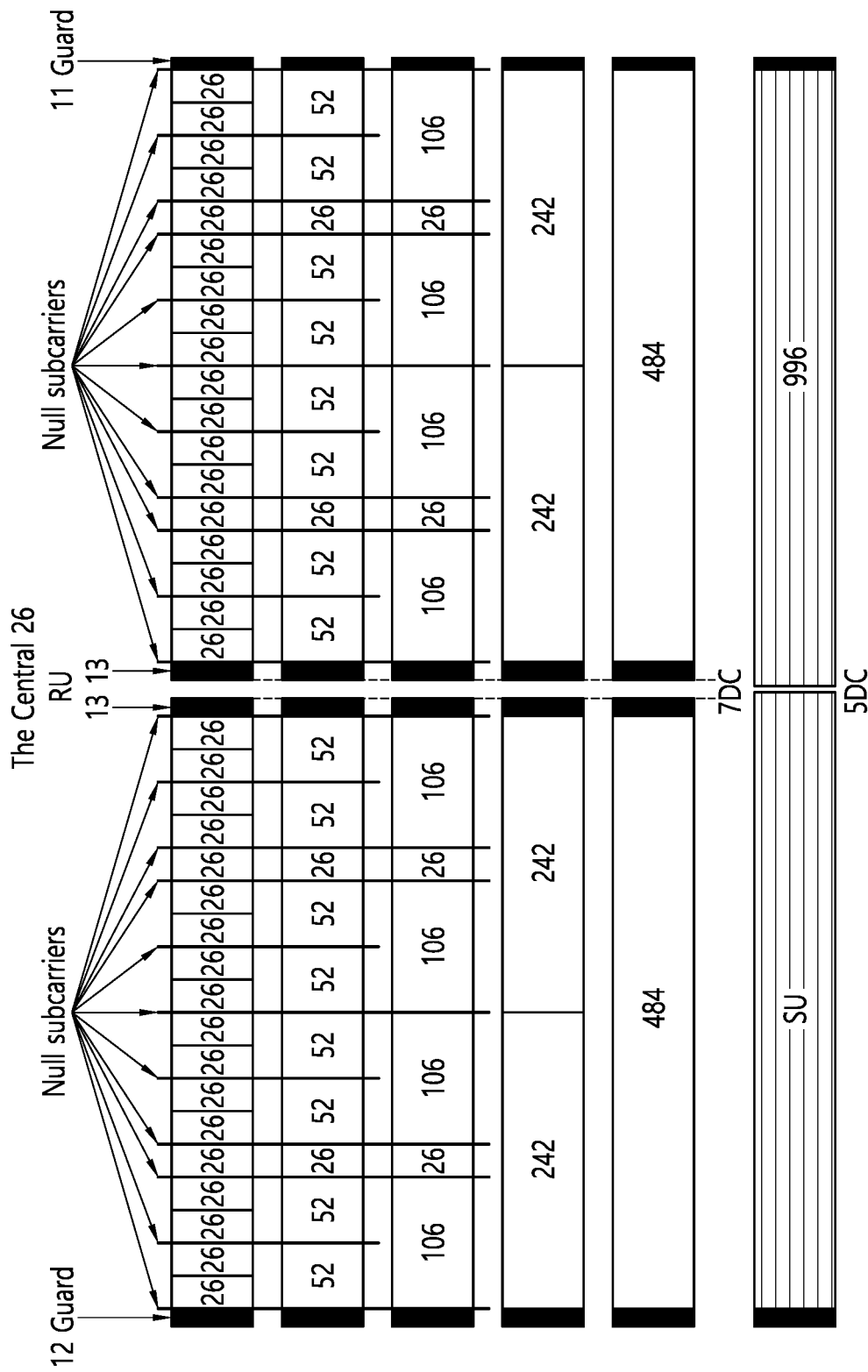
FIG. 17 is a diagram showing an arrangement of RUs used in an 80 MHz band.

FIG. 17 is a view showing an arrangement of RUs used in an 80 MHz band.

Figure 26:
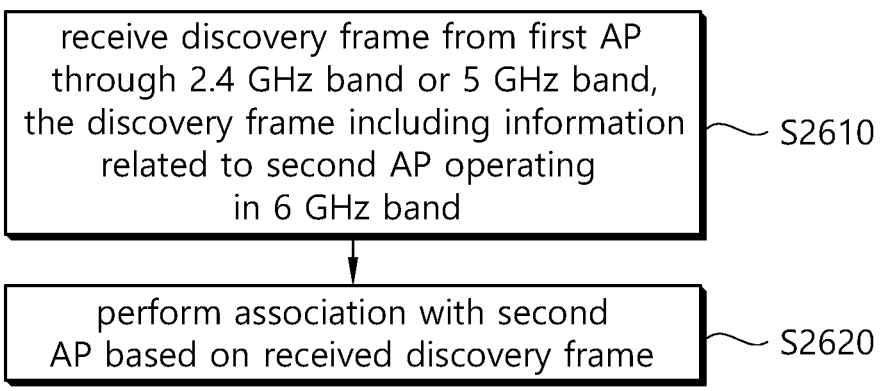
FIG. 26 is a flowchart illustrating an example of the present disclosure.

Similar to the use of RUs having various sizes in the examples of FIGS. 15 and 16, 26-RU, 52-RU, 106-RU, 242-RU, 484-RU, 996-RU, etc. may also be used in the example of FIG. 17. In addition, 7 DC tones may be inserted into a center frequency, 12 tones may be used as a guard band at the leftmost band of the 80 MHz band, and 11 tones may be used as a guard band at the rightmost band of the 80 MHz band. In addition, a 26-RU using 13 tones located on the left and right of the DC band may be used.

Further, as shown, when used for a single user, a 996-RU may be used, and in this case, 5 DC tones may be inserted.

Meanwhile, the fact that the specific number of the RUs is changed is the same as those of FIGS. 15 and 16.

The RUs shown in FIGS. 15 to 17 may be used for OFDMA-based communication. That is, any one RU (26/52/106/242-RU, etc.) shown in FIGS. 15 to 17 may be allocated to any one STA, and the other RU may be allocated to another STA. That is, MU communication is possible by allocating the RUs shown in FIGS. 15 to 17 to a plurality of STAs. MU communication may be applied to downlink communication as well as to uplink communication.

Hereinafter, a legacy target wake time (TWT) technique/operation will be described.

The TWT technique optimizes a time interval for maintaining an awake state (or power-on, active state) of the STA and a time interval for maintaining a doze state (or sleep, inactive state) to reduce battery consumption of the STA. The TWT technique was proposed in the legacy IEEE 802.11ah standard and has been further improved from the legacy IEEE 802.11ax standard.

The legacy TWT technique may be classified into a broadcast TWT technique and an individual TWT technique.

Figure 18:
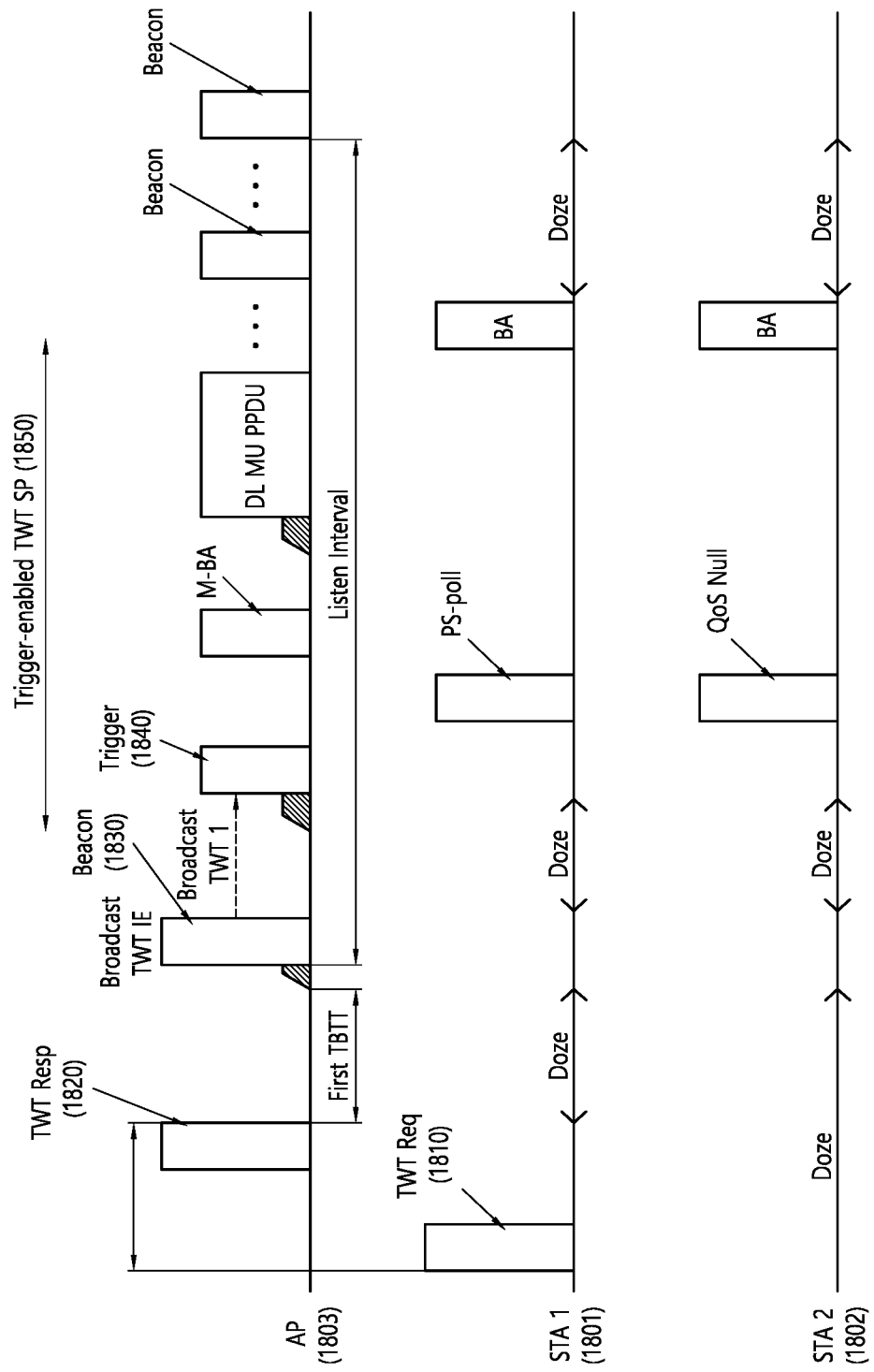
FIG. 18 illustrates an example of a legacy broadcast target wake time (TWT) technique/operation.

FIG. 18 illustrates an example of a legacy broadcast TWT technique/operation.

Illustrated STA1 1801, STA2 1802, and AP 1803 are STAs supporting the TWT technique/operation. The STA1 1801 and the AP 1803 may determine/negotiate multiple parameters for the broadcast TWT operation through a TWT request frame 1810 and a TWT response frame 1820.

After receiving the TWT response frame 1820, the STA1 1801 may enter a doze state to reduce battery consumption. Thereafter, the STA1 1801 may terminate the doze state and enter an awake state in order to receive a beacon frame 1830. Information related to a reception time (i.e., target beacon transmission time (TBTT)) of the beacon frame 1830 may be included in the TWT response frame 1820.

The STA1 1801 may receive a parameter related to a TWT operation included in the beacon frame 1830 and may receive information related to a trigger frame 1840 received thereafter. In addition, the STA1 1801 may acquire information related to a service period 1850 in which the STA1/2 1801 and 1802 maintain an awake state through the beacon frame 1830.

The example of FIG. 18 relates to an example in which a trigger frame 1840 is received during the service period 1850. In response to the trigger frame 1840, the STA1/2 1801 and 1802 may perform uplink communication (e.g., a PS-poll frame or QoS null frame of FIG. 18), through which the AP 1803 may recognize that the STA1/2 1801 and 1802 normally operate in the awake state.

Through the legacy TWT operation as shown in FIG. 18, one STA or a plurality of STAs maintain a dose state during an intended time interval, thereby reducing power consumption.

Hereinafter, an example of the present disclosure related to a 6 GHz band will be described.

Since the 6 GHz band is distinguished from the 2.4 and 5 GHz bands mainly used in the legacy WLAN system, it may be importantly used to improve the performance of the WLAN system. That is, since a legacy STA operates at 2.4 and 5 GHz, an STA (e.g., an HE STA) operating in the 6 GHz band may perform communication without a risk of collision with the legacy STA. For this reason, the 6 GHz band may be importantly utilized to improve the performance of the WLAN system.

For example, enhanced distributed channel access (EDCA) backoff may be blocked for some bands/channels of a 6 GHz band. That is, when a user-STA has uplink data, the uplink data is not transmitted based on contention (i.e., EDCA backoff) but may be transmitted only by a legacy trigger frame received from the AP. In this case, an STA operating in some bands/channels of the 6 GHz band may perform efficient communication without a risk of collision due to EDCA backoff.

As described above, communication in the 6 GHz band may help to improve the performance of the WLAN system. Accordingly, an example of the present disclosure proposes an example of improving an access procedure for the 6 GHz band.

Specifically, the following example relates to improving a discovery frame. The discovery frame may be the beacon frame or the probe response frame described in FIGS. 7 to 9.

The following receiving STA (e.g., user STA) may communicate with a transmitting STA co-located with a plurality of APs. That is, in the following example, the transmitting STA includes a first AP supporting the 2.4 GHz band and/or the 5 GHz band and a second AP supporting the 6 GHz band, and the first AP and the second AP may be co-located.

The receiving STA may receive a discovery frame from the transmitting STA through the 2.4 GHz band and/or the 5 GHz band. The discovery frame received through the 2.4 GHz band and/or the 5 GHz band may include information related to a BSS/AP related to the 6 GHz band.

In the following example, an example of information related to a BSS/AP related to the 6 GHz band (i.e., an example of information included in the discovery frame) is as follows. For example, the discovery frame may include first information related to a type of a physical (PHY) layer supported by the second AP operating in the 6 GHz band, second information related to a load of a BSS to which the second AP belongs, third information related to the TWT operation supported by the second AP, and fourth information related to an operating channel in the 6 GHz band. The first to fourth information may be implemented through different information fields/bits.

Figure 19:
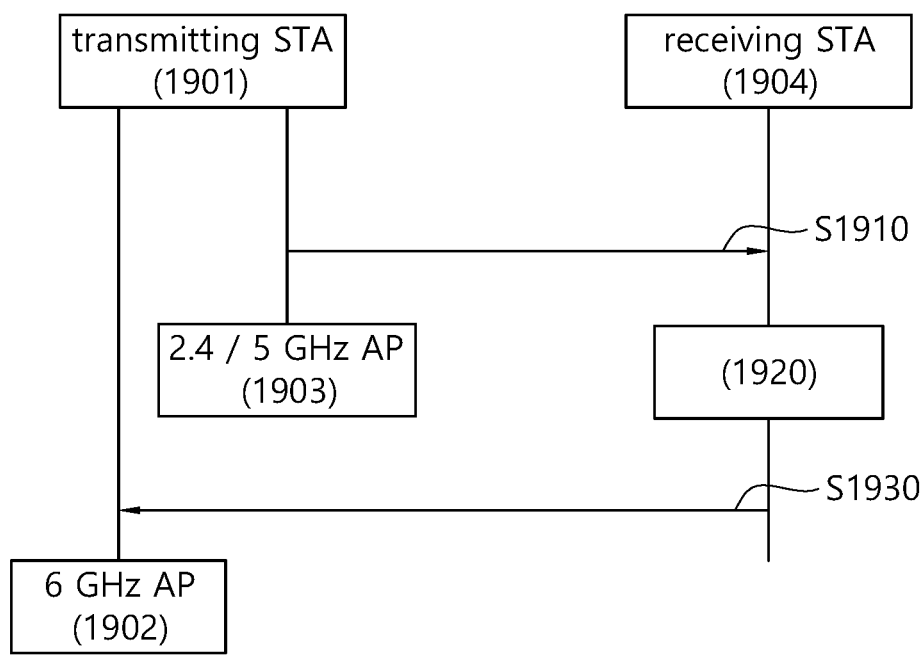
FIG. 19 illustrates a discovery related procedure performed based on the present disclosure.

FIG. 19 illustrates a discovery related procedure performed based on the present disclosure.

As shown in FIG. 19, a transmitting STA 1901 may include a first AP 1902 supporting the 2.4 GHz band and/or the 5 GHz band and a second AP 1902 supporting the 6 GHz band. Further, the first AP 1902 and the second AP 1902 may be co-located. For example, the first AP 1902 and the second AP 1902 may be controlled through a common processor (not shown) implemented as a single chip. For example, the same SSID/BSSID may be allocated to the first AP 1902 and the second AP 1902, or different SSID/BSSID may be allocated thereto. For example, the first AP 1902 and the second AP 1902 may share some RF units (e.g., transmit/receive antennas).

As shown, a receiving STA 1904 may receive a discovery frame from the first AP 1903 (S1910). Since the first AP 1930 supports the 2.4 GHz band and/or the 5 GHz band, the discovery frame may be received through any one of the 2.4 GHz band and the 5 GHz band.

Preferably, the discovery frame includes information related to a BSS/AP related to the 6 GHz band. Through this, the receiving STA 1904 may acquire information related to the BSS or AP related to the 6 GHz band (S1920). As a result, the receiving STA 1904 may perform association with the second AP 1902 based on the acquired information (S1930).

As described above, the discovery frame may include at least four pieces of information (e.g., first to fourth information). Hereinafter, specific information included in the discovery frame will be described.

The discovery frame of the present disclosure may improve a neighbor report defined in the legacy WLAN system.

FIG. 20 shows a legacy neighbor report to be improved by the present disclosure. In a WLAN system, the neighbor report may be used to transmit information related to a BSS located nearby to an STA. That is, if the STA knows information related to a surrounding BSS in advance before performing the process of discovering the surrounding BSS, the STA may smoothly operate, and thus the neighbor report may be periodically or repeatedly transmitted to the STA.

As shown in FIG. 20, the legacy neighbor report may include BSSID 2010, Operating Class 2020, Channel Number 2030, and Sub-element 2040 fields. The BSSID field 2010 of FIG. 20 may include a BSSID of a BSS related to the neighbor report of FIG. 20 (i.e., a target BSS to which related information is reported through the neighbor report). The Operating Class field 2020 and the Channel Number field 2030 of FIG. 20 are information for identifying an operating channel of the BSS related to the neighbor report of FIG. 20. Based on the Operating Class field 2020 and the Channel Number field 2030, the receiving STA may obtain information related to a center frequency of an operating channel of a neighbor BSS, a width of the operating channel, and/or regulatory requirements applied to the operating channel (e.g., a maximum transmit power value). In addition, the Sub-element field 2040 of FIG. 20 may include additional information for the neighbor report.

This disclosure proposes an example of improving the neighbor report of FIG. 20. That is, the discovery frame proposed in this disclosure may include an improved neighbor report. More specifically, the first information related to the type of the PHY layer supported by the second AP and the second information related to a load of the BSS to which the second AP belongs described above may be transmitted through the example of FIG. 21 described below.

FIG. 21 shows a part of the improved neighbor report proposed in the present disclosure. All fields shown in FIG. 21 may be included in the BSSID field 2010 of FIG. 20.

AP Reachability field 2110 of FIG. 21 includes information related to whether the BSS (i.e., target BSS) related to the neighbor report is reachable even before an authentication (e.g., authentication of FIG. 9) process. Security field 2111 and Key Scope field 2112 of FIG. 21 include information related to security of the BSS related to the neighbor report. Capabilities field 2113 and Mobility Domain field 2114 of FIG. 21 include information related to capability/mobility of the BSS related to the neighbor report.

High Throughput field 2120, Very High Throughput field 2130, and High Efficiency field 2140 of FIG. 21 may be related to a PHY type of the BSS related to the neighbor report. That is, when the target BSS supports an operation according to the High Throughput standard (i.e., IEEE 802.11n standard), the High Throughput field 2120 may have a first value. In addition, when the target BSS supports an operation according to the Very High Throughput standard (i.e., IEEE 802.11ac standard), the Very High Throughput field 2130 may have a first value. Also, when the target BSS supports an operation according to the High Efficiency standard (i.e., the IEEE 802.11ax standard), the High Efficiency field 2140 may have a first value.

The ER BSS field 2150 of FIG. 21 includes information related to whether the target BSS transmits a beacon using an HE extended range (HE ER) SU PPDU.

In addition, Co-located AP field 2160 of FIG. 21 includes information related to whether an AP included in the target BSS is co-located with an AP transmitting the neighbor report. For example, when the AP included in the target BSS is co-located with the AP transmitting the neighbor report, the co-located AP field 2160 may have a first value.

An example of FIG. 20/FIG. 21 will be described in conjunction with FIG. 19 as follows.

For example, in the example of FIG. 19, the receiving STA 1904 may receive information related to the second AP 1902 from the first AP 1902 in step S1910. That is, the discovery frame received in step S1910 may include the neighbor report of FIG. 20/21. In other words, the target BSS of the discovery frame received in step S1910 may be the second AP 1920.

For example, the High Efficiency field 2140 of the neighbor report included in step S1910 may have a first value. That is, since the second AP 1902 related to the target BSS operates in the 6 GHz band and the IEEE 802.11ax standard is operable in the 6 GHz band unlike the legacy standard, the second AP 1920 may be able to support the High Efficiency standard. In other words, the first information related to the type of the PHY layer supported by the second AP 1920 may be identified through the High Efficiency field 2140 of FIG. 21.

In addition, in the example of FIG. 19, since the first AP 1902 and the second AP 1902 are co-located, the Co-located AP field 2160 of the neighbor report transmitted in step S1910 may have a first value.

FIG. 22 shows an example of an information field for reporting information related to a BSS load.

The example of FIG. 22 may be included in the neighbor report of FIG. 20/21. For example, the example of FIG. 22 may be included in the Sub-element field 2040 of FIG. 20.

As described above, the present disclosure proposes an example of transmitting/receiving second information related to a load of the BSS to which the second AP belongs through a discovery frame. This second information may be transmitted/received through the example of FIG. 22. That is, the second information may be transmitted/received through the Sub-element field 2040 of the neighbor report of FIG. 20.

In this disclosure, information related to the BSS load may be transmitted/received through various specific information fields. The example of FIG. 22 shows various specific information fields for transmitting information related to BSS load.

As shown, HE STA count field 2210 of FIG. 22 includes information related to the sum of HE STAs (that is, STAs supporting the HE standard) associated with the target BSS of the neighbor report including the field of FIG. 22.

In addition, Utilization field 2220 of FIG. 22 is related to information of a busy interval for the target BSS of the neighbor report including the field of FIG. 22. Specifically, the Utilization field 2220 includes information related to a length of a time interval in which a channel in the target BSS is determined to be busy. The Utilization field 2220 may be determined based on a primary channel in the target BSS, and whether a specific channel is busy may be determined based on a carrier sensing technique for the corresponding channel.

In addition, Frequency Underutilization field 2230 of FIG. 22 includes information related to frequency domain resources that are under utilized in the target BSS. A value of the Frequency Underutilization field 2230 may be set based on an RU (26/52/106/242, etc.) not allocated for an STA in the target BSS. That is, when the number of RUs not allocated by the second AP increases, the value of the Frequency Underutilization field 2230 may increase.

In addition, Spatial Stream Underutilization field 2240 of FIG. 22 includes information related to a spatial domain resource underutilized by the second AP in the target BSS. A value of the Spatial Stream Underutilization field 2240 may be set based on a spatial stream that is not allocated for an STA in the target BSS. That is, if the spatial stream that is not allocated by the second AP increases, the value of the Spatial Stream Underutilization field 2240 may increase.

Hereinafter, a technique of transmitting and receiving the third information related to the TWT operation supported by the second AP operating in the 6 GHz band and the fourth information related to an operating channel in the 6 GHz band through the first AP operating in the 2.4/5 GHz band will be described.

FIG. 23 is an example of a field indicating information related to a target BSS operating in the 6 GHz band.

FIG. 23 shows an example of a modification of the legacy HE Operation element format. The legacy HE Operation element format includes control information for an STA operating according to the HE standard. FIG. 23 proposed in the present disclosure transmits and receives information related to a specific AP/BSS operating in the 6 GHz band by modifying some bits of the legacy HE Operation element format.

Specifically, HE Operation Parameters field 2310 of FIG. 23 may be further modified to include information related to a target BSS operating in the 6 GHz band. In addition, 6 GHz Operation Information field 2320 of FIG. 23 may be further modified to include another information related to the target BSS operating in the 6 GHz band. Specifically, the present disclosure proposes an example of modifying some fields 2310 and 2320 of FIG. 23 and including the third information related to the TWT operation supported by the second AP operating in the 6 GHz band and the fourth information related to an operating channel in the 6 GHz band, in the modified field.

An operation of the STA will be described with reference to FIGS. 23 and 19 as follows. The field of FIG. 23 may be received by the receiving STA in step S1910 of FIG. 19. The field of FIG. 23 may be included in the discovery frame. That is, for example, the field of FIG. 23 may be included in the discovery frame together with the neighbor report of FIG. 20/21 and transmitted to the receiving STA in step S1910.

FIG. 24 is an example of additional information related to the target BSS operating in the 6 GHz band. The example of FIG. 24 may be included in HE Operation Parameters field 2310 of FIG. 23. TWT Required field 2410 of FIG. 24 includes information related to whether the target BSS requests TWT capability from associated STAs. For example, when the target BSS (or the second AP) operating in the 6 GHz band allows association only for STAs supporting the TWT capability, the TWT Required field 2410 may have a first value. Otherwise, the TWT Required field 2410 may have a second value. The TWT Required field 2410 may be implemented as a 1-bit field.

As a result, the third information related to the TWT operation supported by the second AP operating in the 6 GHz band may be transmitted/received through the TWT Required field 2410 of FIG. 24.

6 GHz Operation Information Present field 2420 of FIG. 24 includes information related to whether the 6 GHz Operation Information field 2320 is included in the HE Operation element format of FIG. 23. For example, when the 6 GHz Operation Information field 2320 is included in the HE Operation element format of FIG. 23, the 6 GHz Operation Information Present field 2420 may have a first value. The 6 GHz Operation Information Present field 2420 may be implemented as a 1-bit field.

FIG. 25 is another example of additional information related to the target BSS operating in the 6 GHz band.

The field of FIG. 25 may be included in the 6 GHz Operation Information field 2320 of FIG. 23. That is, the fourth information related to the operating channel of the target BSS (or the second AP) operating in the 6 GHz band may be transmitted/received based on the field of FIG. 25.

Primary Channel field 2510 of FIG. 25 may include identification information (e.g., channel number) on a primary channel in the operating channel of the target BSS (or a second AP) operating in the 6 GHz band. The primary channel may be a channel through which a beacon for the 6 GHz band is received.

Control field 2520 of FIG. 25 may include information related to a width of the operating channel of the target BSS (or the second AP).

Channel Center Frequency Segment 0 field 2530 of FIG. 25 may include information related to a center frequency (e.g., index information indicating the center frequency) of the operating channel of the target BSS (or the second AP). For example, when the operating channel of the target BSS (or the second AP) is 20/40/80 MHz, the corresponding field 2530 may include information related to the center frequency of the 20/40/80 MHz channel. If the operating channel of the target BSS (or the second AP) is 80+80 MHz, the corresponding field 2530 may include information related to a center frequency of a primary 80 MHz channel among the 80+80 MHz channels.

Channel Center Frequency Segment 1 field 2540 of FIG. 25 may include another information related to the center frequency of the operating channel of the target BSS (or the second AP). For example, if the operating channel of the target BSS (or the second AP) is 80+80 MHz, the corresponding field 2540 may include information related to a center frequency of a secondary 80 MHz channel among the 80+80 MHz channels. In addition, if the operating channel of the target BSS (or the second AP) is 160 MHz, the corresponding field 2540 may include information related to a center frequency of the corresponding 160 MHz channel.

FIG. 26 is a flowchart illustrating an example of the present disclosure.

As shown in FIG. 26, in step S2610, the receiving STA receives a discovery frame from the first AP through the 2.4 GHz band or the 5 GHz band, and the discovery frame includes information related to the second AP operating in the 6 GHz band.

In step S2610, an example of the information related to the second AP operating in the 6 GHz band may include the first information related to the type of the PHY layer supported by the second AP operating in the 6 GHz band, the second information related to a load of the BSS (Basic Service Set) to which the second AP belongs, the third information related to the TWT operation supported by the second AP, and the fourth information related to the operating channel in the 6 GHz band.

The first information may be information related to whether the High Efficiency (HE) standard is supported by the second AP. The second information may include information related to the total number of high efficiency (HE) STAs (stations) associated with the second AP, information related to frequency domain resources not utilized by the second AP, and information related to spatial domain resources not utilized by the second AP. The third information may include information related to whether a target wake time (TWT) operation is required for the STA associated with the second AP. The fourth information may include information related to the width of the operating channel and information related to the center frequency of the operating channel.

In step S2620, the receiving STA may perform association with the second AP based on the received discovery frame. That is, the receiving SA may perform association by exchanging association request/response frames with the second AP on the 6 GHz band based on the information related to the 6 GHz band.

Figure 27:
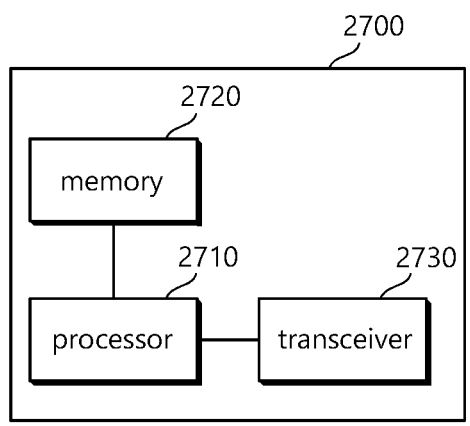
FIG. 27 shows a user-STA or AP to which an example of the present disclosure is applied.

FIG. 27 shows a user-STA or AP to which an example of the present disclosure is applied.

An STA 2700 of FIG. 27 may be a user-STA or an AP.

Referring to FIG. 27, the STA 2700 may include a processor 2710, a memory 2720, and a transceiver 2730. The illustrated processor, memory, and transceiver may each be implemented as separate chips, or at least two or more blocks/functions may be implemented through a single chip.

The illustrated transceiver 2730 performs a signal transmission/reception operation. Specifically, IEEE 802.11 packets (e.g., IEEE 802.11a/b/g/n/ac/ax/be, etc.) may be transmitted and received.

The processor 2710 may implement the functions, processes, and/or methods proposed in the present disclosure. Specifically, the processor 2710 may receive a signal through the transceiver 2730, process a received signal, generate a transmission signal, and perform control for signal transmission.

The processor 2710 may include an application-specific integrated circuit (ASIC), another chipset, a logic circuit, and a data processing device. The memory 2720 may include a read-only memory (ROM), a random access memory (RAM), a flash memory, a memory card, a storage medium, and/or other storage device.

The memory 2720 may store a signal (i.e., a received signal) received through the transceiver and store a signal (i.e., a transmission signal) to be transmitted through the transceiver. That is, the processor 2710 may acquire the received signal through the memory 2720 and store the signal to be transmitted in the memory 2720.

Figure 28:
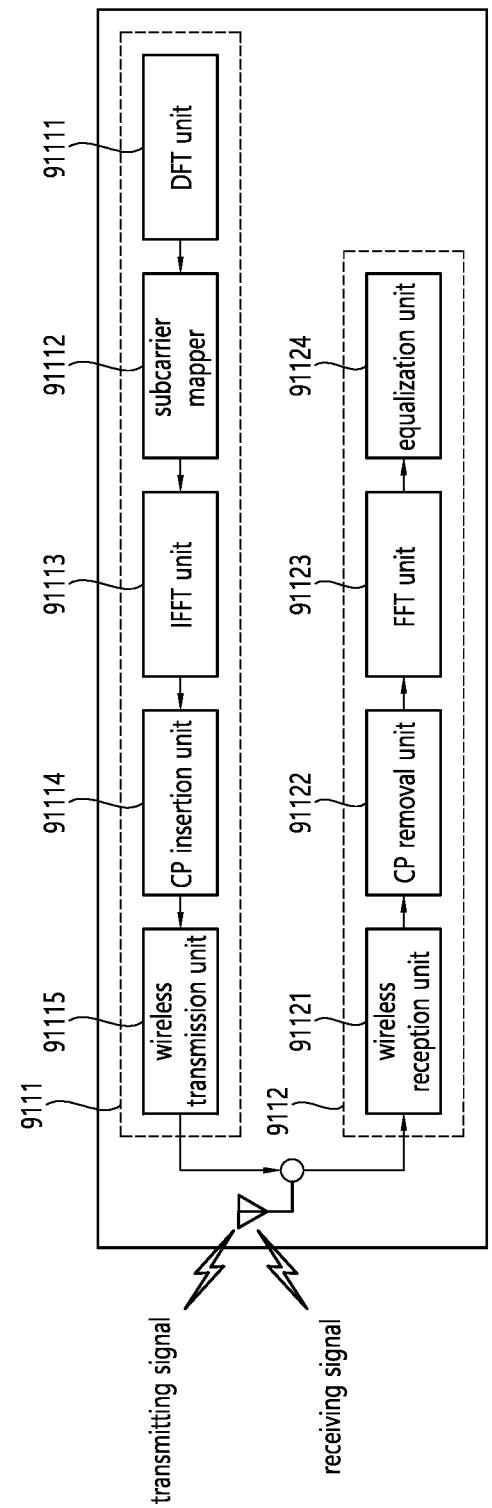
FIG. 28 shows another example of a specific block diagram of a transceiver.

FIG. 28 shows another example of a specific block diagram of a transceiver. Some or all of the blocks of FIG. 28 may be included in the processor 2710. Referring to FIG. 28, a transceiver 9110 includes a transmission part 9111 and a reception part 9112. The transmission part 9111 may include a discrete Fourier transform (DFT) unit 91111, a subcarrier mapper 91112, an IFFT unit 91113 a CP insertion unit 91114, and a wireless transmission unit 91115. The transmission part 9111 may further include a modulator. In addition, for example, the transmission part 911 may further include a scramble unit (not shown), a modulation mapper (not shown), a layer mapper (not shown), and a layer permutator (not shown). These components may be disposed before the DFT unit 91111. That is, in order to prevent an increase in a peak-to-average power ratio (PAPR), the transmission part 9111 first allows information to go through the DFT unit 91111 before mapping a signal to a subcarrier. A signal spread (or precoded in the same sense) by the DFT unit 91111 is mapped through the subcarrier mapper 91112 and then generated as a signal on a time axis again through an Inverse fast Fourier transform (IFFT) unit 91113.

The DFT unit 91111 performs DFT on input symbols and outputs complex-valued symbols. For example, when Ntx symbols are input (here, Ntx is a natural number), a DFT size is Ntx. The DFT unit 91111 may be referred to as a transform precoder. The subcarrier mapper 91112 maps the complex-valued symbols to each subcarrier in a frequency region. The complex symbols may be mapped to resource elements corresponding to a resource block allocated for data transmission. The subcarrier mapper 91112 may be referred to as a resource element mapper. The IFFT unit 91113 performs IFFT on an input symbol and outputs a baseband signal for data as a time domain signal. The CP insertion unit 91114 copies a rear part of the base band signal for data and inserts it into a front part of the base band signal for data. Inter-symbol interference (ISI) and inter-carrier interference (ICI) may be prevented through CP insertion, so that orthogonality may be maintained even in a multipath channel.

Meanwhile, the receiving part 9112 includes a wireless reception unit 91121, a CP removal unit 91122, an FFT unit 91123, an equalization unit 91124, and the like. The wireless reception unit 91121, the CP removal unit 91122, and the FFT unit 91123 of the receiving part 9112 perform reverse functions of the wireless transmission unit 91115, the CP insertion unit 91114, and the IFFT unit 91113 of the transmitting part 9111. The receiving part 9112 may further include a demodulator.

In addition to the illustrated blocks, the transceiver of FIG. 28 may include a reception window controller (not shown) extracting a part of a received signal and a decoding operation processing unit (not shown) performing a decoding operation on a signal extracted through a reception window.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, the method comprising:

receiving a probe response frame from a first access point (AP) through a 2.4 GHz band or a 5 GHz band, wherein the probe response frame includes a Neighbor Report element related to a second AP operating in a 6 GHz band, and the first AP is in a same co-located AP set as the second AP, wherein the Neighbor Report element includes a Basic Service Set Identifier (BSSID) field related to a Basic Service Set (BSS) being reported and a BSSID information field including 1-bit information related to whether the second AP is a High Efficiency (HE) AP, wherein the BSSID field has a length of 6 octets and the BSSID information field has a length of 4 octets, wherein the Neighbor Report element further includes an HE Basic Service Set (BSS) load element and an HE operation element, wherein the HE BSS load element includes information related to utilization, frequency underutilization and spatial stream underutilization, wherein the HE operation element includes a 6 GHz Operation Information field providing channel and bandwidth information related to 6 GHz operation, wherein the HE operation element further includes an HE Operation Parameters field including a Target Wake Time (TWT) required subfield and a 6 GHz Operation Information Present field, the TWT required subfield has a length of 1 bit and is related to associated non-AP HE stations (STAs) of the second AP, and the 6 GHz Operation Information Present field has a length of 1 bit and is set to one (1) to indicate that the 6 GHz Operation Information field is present; and based on the probe response frame, performing association.

2. The method of claim 1, wherein the information related to the utilization is considered as one octet field, the information related to the frequency underutilization is considered as one octet field, and the information related to the spatial stream underutilization is considered as one octet field.

3. The method of claim 1, wherein the Basic Service Set Identifier (BSSID) field is contiguous to the BSSID information field.

4. A station in a wireless local area network (WLAN) system, the station comprising:

at least one processor; and at least one computer memory operably connectable to the at least one processor and storing instructions that, based on being executed by the at least one processor, perform operations comprising:

receiving a probe response frame from a first access point (AP) through a 2.4 GHz band or a 5 GHz band, wherein the probe response frame includes a Neighbor Report element related to a second AP operating in a 6 GHz band, and the first AP is in a same co-located AP set as the second AP, wherein the Neighbor Report element includes a Basic Service Set Identifier (BSSID) field related to a Basic Service Set (BSS) being reported and a BSSID information field including 1-bit information related to whether the second AP is a High Efficiency (HE) AP, wherein the BSSID field has a length of 6 octets and the BSSID information field has a length of 4 octets, wherein the Neighbor Report element further includes an HE Basic Service Set (BSS) load element and an HE operation element, wherein the HE BSS load element includes information related to utilization, frequency underutilization and spatial stream underutilization, wherein the HE operation element includes a 6 GHz Operation Information field providing channel and bandwidth information related to 6 GHz operation, wherein the HE operation element further includes an HE Operation Parameters field including a Target Wake Time (TWT) required subfield and a 6 GHz Operation Information Present field, the TWT required subfield has a length of 1 bit and is related to associated non-AP HE stations (STAs) of the second AP, and the 6 GHz Operation Information Present field has a length of 1 bit and is set to one (1) to indicate that the 6 GHz Operation Information field is present; and based on the probe response frame, performing association.

5. The station of claim 4, wherein the information related to the utilization is considered as one octet field, the information related to the frequency underutilization is considered as one octet field, and the information related to the spatial stream underutilization is considered as one octet field.

6. The station of claim 4, wherein the Basic Service Set Identifier (BSSID) field is contiguous to the BSSID information field.

7. A method in a wireless local area network (WLAN) system, the method comprising:

generating, by a first access point (AP), a probe response frame through a 2.4 GHz band or a 5 GHz band, wherein the probe response frame includes a Neighbor Report element related to a second AP operating in a 6 GHz band, and the first AP is in a same co-located AP set as the second AP, wherein the Neighbor Report element includes a Basic Service Set Identifier (BSSID) field related to a Basic Service Set (BSS) being reported and a BSSID information field including 1-bit information related to whether the second AP is a High Efficiency (HE) AP, wherein the BSSID field has a length of 6 octets and the BSSID information field has a length of 4 octets, wherein the Neighbor Report element further includes an HE Basic Service Set (BSS) load element and an HE operation element, wherein the HE BSS load element includes information related to utilization, frequency underutilization and spatial stream underutilization, wherein the HE operation element includes a 6 GHz Operation Information field providing channel and bandwidth information related to 6 GHz operation, wherein the HE operation element further includes an HE Operation Parameters field including a Target Wake Time (TWT) required subfield and a 6 GHz Operation Information Present field, the TWT required subfield has a length of 1 bit and is related to associated non-AP HE stations (STAs) of the second AP, and the 6 GHz Operation Information Present field has a length of 1 bit and is set to one (1) to indicate that the 6 GHz Operation Information field is present; and transmitting, by the first AP, the probe response frame.

8. The method of claim 7, wherein the information related to the utilization is considered as one octet field, the information related to the frequency underutilization is considered as one octet field, and the information related to the spatial stream underutilization is considered as one octet field.

9. The method of claim 7, wherein the Basic Service Set Identifier (BSSID) field is contiguous to the BSSID information field.

* * * * *